(12) United States Patent
Kaneoya et al.

(10) Patent No.: US 8,860,912 B2
(45) Date of Patent: Oct. 14, 2014

(54) LIQUID CRYSTAL DISPLAY DEVICE

(71) Applicant: DIC Corporation, Tokyo (JP)

(72) Inventors: Masakazu Kaneoya, Kitaadachi-gun (JP); Kiyofumi Takeuchi, Kitaadachi-gun (JP); Akira Kimura, Kamisu (JP); Seiji Funakura, Kamisu (JP); Katsunori Shimada, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/115,050

(22) PCT Filed: Jan. 29, 2013

(86) PCT No.: PCT/JP2013/051860
§ 371 (c)(1),
(2), (4) Date: Oct. 31, 2013

(87) PCT Pub. No.: WO2013/115164
PCT Pub. Date: Aug. 8, 2013

(65) Prior Publication Data
US 2014/0211138 A1 Jul. 31, 2014

(30) Foreign Application Priority Data

Feb. 1, 2012 (JP) ................................. 2012-019794

(51) Int. Cl.
| | | |
|---|---|---|
| *G02F 1/1335* | (2006.01) | |
| *G02F 1/1343* | (2006.01) | |
| *C09K 19/20* | (2006.01) | |
| *C09K 19/30* | (2006.01) | |
| *C09K 19/32* | (2006.01) | |
| *C09K 19/12* | (2006.01) | |
| *C09K 19/38* | (2006.01) | |

(52) U.S. Cl.
CPC ................... *G02F 1/133514* (2013.01)
USPC ........... 349/108; 349/143; 349/178; 349/183; 252/299.1; 252/299.5; 252/299.61; 252/299.62; 252/299.63; 252/299.66

(58) Field of Classification Search
USPC .......................... 349/108, 141, 178, 143, 183; 252/299.1, 299.5, 299.61, 299.62, 252/299.66, 299.67, 299.63
See application file for complete search history.

(56) References Cited

U.S. PATENT DOCUMENTS

2005/0280762 A1* 12/2005 Lee et al. ...................... 349/141
2006/0257763 A1   11/2006 Araki
(Continued)

FOREIGN PATENT DOCUMENTS

| CN | 101133138 A | 2/2008 |
|---|---|---|
| JP | 2000-019321 A | 1/2000 |

(Continued)

OTHER PUBLICATIONS

International Search Report of PCT/JP2013/051860, mailing date of Mar. 5, 2013.

(Continued)

*Primary Examiner* — Shean C Wu
(74) *Attorney, Agent, or Firm* — Westerman, Hattori, Daniels & Adrian, LLP

(57) ABSTRACT

There is provided a liquid crystal display device capable of preventing a decrease in voltage holding ratio (VHR) of a liquid crystal layer and an increase in ion density (ID) and resolving the problem of display defects such as white spots, alignment unevenness, image sticking, and the like. The liquid crystal display device prevents a decrease in voltage holding ratio (VHR) of a liquid crystal layer and an increase in ion density (ID) and suppressing the occurrence of display defects such as image sticking and the like. The liquid crystal display device is thus useful for a VA-mode or PSVA-mode liquid crystal display device for active matrix driving. The application of the device includes liquid crystal display devices such as liquid crystal TVs, monitors, cellular phones, and smart phones.

16 Claims, 1 Drawing Sheet

(56) References Cited

U.S. PATENT DOCUMENTS

| | | |
|---|---|---|
| 2010/0271569 A1 | 10/2010 | Ohkuma et al. |
| 2013/0169906 A1* | 7/2013 | Nakanishi et al. ............... 349/69 |
| 2014/0104524 A1* | 4/2014 | Lee et al. ......................... 349/41 |

FOREIGN PATENT DOCUMENTS

| | | | |
|---|---|---|---|
| JP | 2000-192040 | A | 7/2000 |
| JP | 2005-281559 | A | 10/2005 |
| JP | 2006-317602 | A | 11/2006 |
| JP | 2009-109542 | A | 5/2009 |
| JP | 2009-163014 | A | 7/2009 |
| JP | 2010-189560 | A | 9/2010 |
| JP | 2010-256509 | A | 11/2010 |
| JP | 2011-141356 | A | 7/2011 |
| JP | 2011-186043 | A | 9/2011 |
| TW | 2011-24479 | A1 | 7/2011 |
| TW | 201139343 | A | 11/2011 |
| TW | 201142502 | A1 | 12/2011 |
| WO | 2011/092973 | A1 | 8/2011 |
| WO | 2013115164 | A1 | 8/2013 |
| WO | 2013133383 | A1 | 9/2013 |

OTHER PUBLICATIONS

Japanese Office Action for Japanese Patent Application No. 2013-512038, mailing date of Apr. 23, 2013.

Office Action for U.S. Appl. No. 14/002,008, mailing date of Jun. 2, 2014.

* cited by examiner

LIQUID CRYSTAL DISPLAY DEVICE

TECHNICAL FIELD

The present invention relates to a liquid crystal display device.

BACKGROUND ART

Liquid crystal display devices have been used for watches and electronic calculators, various household electric appliances, measuring apparatuses, automotive panels, word processors, electronic notebooks, printers, computers, televisions, etc. Typical examples of a liquid crystal display mode include a TN (twisted nematic) mode, a STN (super twisted nematic) mode, a DS (dynamic light scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, a FLC (ferroelectric liquid crystal), and the like. Also, multiplex driving is popularized as a driving method instead of usual static driving, and a simple matrix method and a recent active matrix (AM) method of driving by TFT (thin-film transistor), TFD (thin-film diode), or the like become the mainstream.

As shown in FIG. 1, a general color liquid crystal display device includes two substrates (1) each having an alignment film (4), a transparent electrode layer (3a) serving as a common electrode and a color filter layer (2) which are disposed between one of the alignment films and the substrate, and a pixel electrode layer (3b) disposed between the other alignment film and the substrate, the substrates are arranged so that the alignment films thereof face each other, and a liquid crystal layer (5) is held between the substrates.

The color filter layer is composed of a black matrix and a color filter including a red color layer (R), a green color layer (G), a blue color layer (B), and, if required, a yellow color layer (Y).

Liquid crystal materials constituting liquid crystal layers have undergone a high level of impurity control because impurities remaining in the materials significantly affect electric characteristics of display devices. In addition, with respect to materials constituting alignment films, it has already been known that an alignment film is in direct contact with a liquid crystal layer, and impurities remaining in the alignment film are moved to the liquid crystal layer and affect the electric characteristics of the liquid crystal layer, and thus characteristics of a liquid crystal display device due to impurities in an alignment film material have been being investigated.

On the other hand, with respect to materials such as organic pigments and the like used in the color filter layers, like the alignment film materials, it is supposed that impurities contained affect the liquid crystal layers. However, an alignment film and a transparent electrode are interposed between the color filter layer and the liquid crystal layer, and thus it has been considered that the direct influence on the liquid crystal layer is greatly smaller than that of the alignment film material. However, the alignment film generally has a thickness of as small as 0.1 µm or less, and the transparent electrode, for example, even a common electrode used on the color filter layer side and having a thickness increased for enhancing conductivity, generally has a thickness of 0.5 µm or less. Therefore, the color filter layer and the liquid crystal layer are not put in a completely isolated environment, and the color filter layer has the possibility of developing display defects such as white spots, alignment unevenness, image sticking, and the like due to a decrease in voltage holding ratio (VHR) of the liquid crystal layer and an increase in ion density (ID) which are caused by impurities contained in the color filter layer through the alignment film and the transparent electrode.

As a method for resolving the display defects due to impurities contained in pigments which constitute a color filter, there have been studied a method of controlling elusion of impurities into a liquid crystal by using a pigment in which a ratio of an extract with ethyl formate is decreased to a specified value or less (Patent Literature 1), and a method of controlling elusion of impurities into a liquid crystal by specifying a pigment in a blue color layer (Patent Literature 2). However, these methods are not much different from a method of simply decreasing impurities in a pigment, and are thus unsatisfactory for improvement for resolving the display defects even in the present situation in which a pigment purifying technique has recently been advanced.

On the other hand, with attention paid to a relation between organic impurities contained in a color filter and a liquid crystal composition, there are disclosed a method of specifying a hydrophobic parameter of liquid crystal molecules contained in a liquid crystal layer to be equal to or higher than a predetermined value, the hydrophobic parameter representing insolubility of the organic impurities in the liquid crystal layer, and a method of preparing a liquid crystal composition containing a predetermined ratio or more of a liquid crystal compound having —$OCF_3$ groups at the ends of liquid crystal molecules because the —$OCF_3$ groups at the ends of liquid crystal molecules have a correlation to the hydrophobic parameter (Patent Literature 3).

However, these cited documents each disclose an invention based on the principle that the influence of impurities in a pigment on a liquid crystal layer is suppressed and disclose no research on a direct relation between a structure of a liquid crystal material and a structure of a colorant such as a dye/pigment or the like used in a color filter, not leading to the resolution of the problem of display defects in advanced liquid crystal display devices.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention is aimed at providing a liquid crystal display device including a specified liquid crystal composition and a color filter using a specified pigment in order to prevent a decrease in voltage holding ratio (VHR) of a liquid crystal layer and an increase in ion density (ID), thereby resolving the problems of display defects such as white spots, alignment unevenness, image sticking, and the like.

Solution to Problem

In order to solve the above-described problems, the inventors intensively studied combinations of colorants such as a dye/pigment and the like which constitute a color filter and structures of liquid crystal materials constituting a liquid crystal layer. As a result it was found that a liquid crystal display device using a specified-structure liquid crystal composition and a color filter containing a specified-structure pigment prevents a decrease in voltage holding ratio (VHR) of a liquid crystal layer and an increase in ion density (ID), thereby resolving the problems of display defects such as white spots, alignment unevenness, image sticking, and the like. This led to the achievement of the present invention.

That is, the present invention provides a liquid crystal display device including a first substrate, a second substrate, a liquid crystal composition layer held between the first substrate and the second substrate, a color filter including a black matrix and at least RGB three-color pixel portions, a pixel electrode, and a common electrode, the liquid crystal composition layer including a liquid crystal composition which contains at least one compound selected from a compound group represented by general formula (LC1) to general formula (LC4),

[Chem. 1]

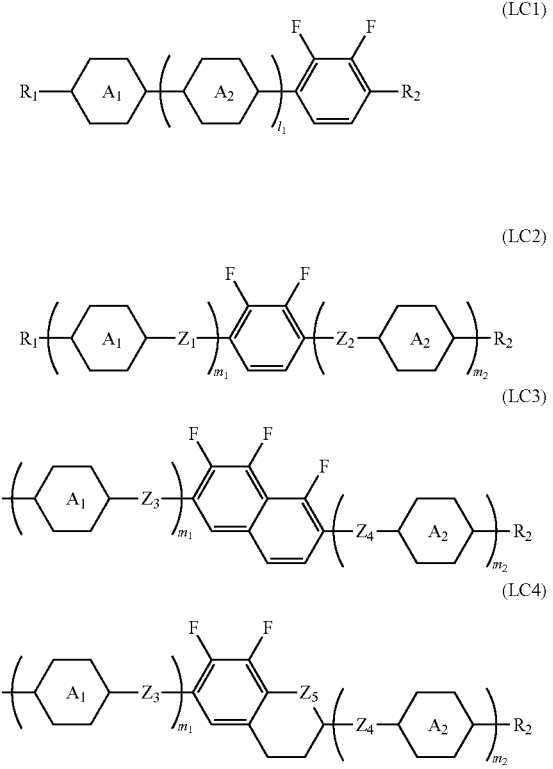

(in the formulae, $R_1$ and $R_2$ each independently represent an alkyl group having 1 to 15 carbon atoms, at least one $CH_2$ group in the alkyl group may be substituted by —O—, —CH=CH—, —CO—, —OCO—, —COO—, —C≡C—, —$CF_2$O—, or —O$CF_2$— so that oxygen atoms are not directly adjacent to each other, at least one hydrogen atom in the alkyl group may be arbitrarily substituted by a halogen, $A_1$ and $A_2$ each independently represent any one of the following structures,

[Chem. 2]

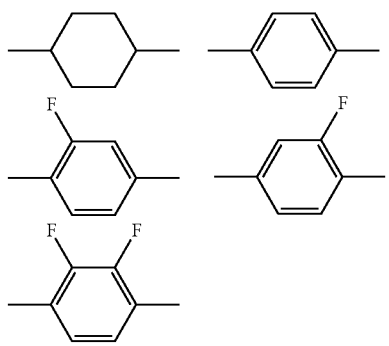

(at least one $CH_2$ group in a cyclohexane ring in the structures may be substituted by an oxygen atom, at least one CH group in a benzene ring in the structures may be substituted by a nitrogen atom, and at least one hydrogen atom in the structures may be substituted by Cl, $CF_3$, or $OCF_3$), $Z_1$ to $Z_4$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—, $Z_5$ represents a $CH_2$ group or an oxygen atom, at least one of $Z_1$ and $Z_2$ present is not a single bond, $l_1$ represents 0 or 1, $m_1$ and $m_2$ each independently represent 0 to 3, and $m_1+m_2$ is 1, 2, or 3), and the RGB three-color pixel portions including, as a colorant in a G pixel portion, a halogenated metal phthalocyanine pigment containing a metal selected as a central metal from the group consisting of Al, Si, Sc, Ti, V, Mg, Fe, Co, Ni, Zn, Ga, Ge, Y, Zr, Nb, In, Sn, and Pb, wherein when the central metal is trivalent, any one of a halogen atom, a hydroxyl group, and a sulfonic acid group is bonded to the central metal or the central metal is oxo- or thio-bridged, and when the central metal is a tetravalent metal, an oxygen atom or any two, which may be the same or different, selected from halogen atoms, hydroxyl groups, and sulfonic acid groups are bonded to the central metal.

Advantageous Effects of Invention

A liquid crystal display device according to the present invention is capable of preventing a decrease in voltage holding ratio (VHR) of a liquid crystal layer and an increase in ion density (ID) by using a specified liquid crystal composition and a color filter including a specified pigment, thereby preventing the occurrence of display defects such as white spots, alignment unevenness, image sticking, and the like.

Figure 1:
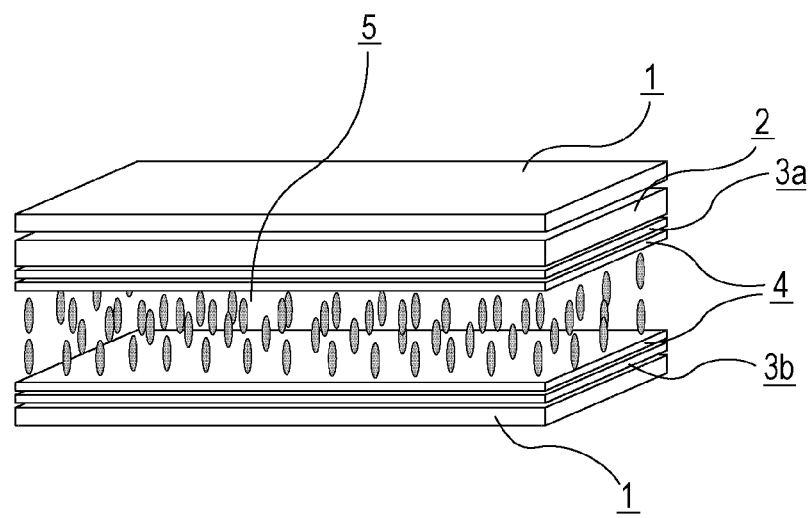
FIG. 1 is a drawing showing an example of a general liquid crystal display device.

REFERENCE SIGNS LIST 1 substrate
2 color filter layer
2a color filter layer containing specified pigment
3a transparent electrode layer (common electrode)
3b pixel electrode layer
4 alignment film
5 liquid crystal layer 5a liquid crystal layer containing specified liquid crystal composition

DESCRIPTION OF EMBODIMENTS

Figure 2:
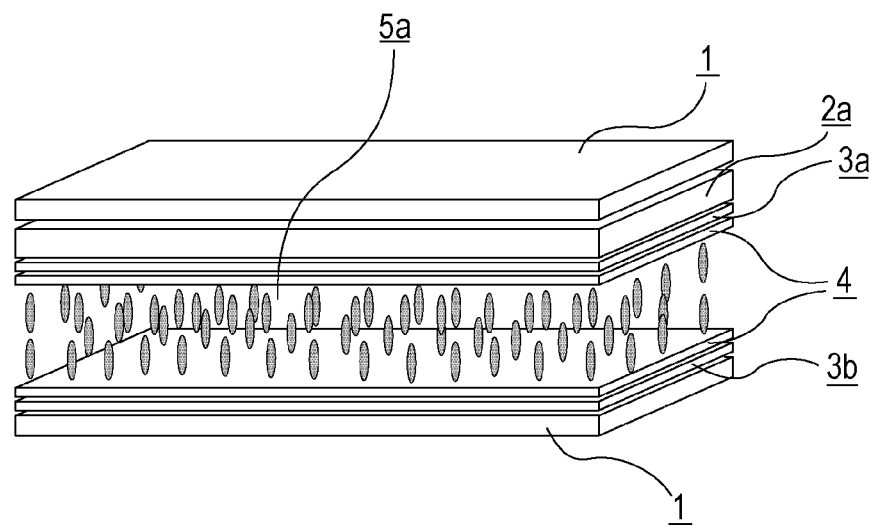
FIG. 2 is a drawing showing an example of a liquid crystal display device according to the present invention.

FIG. 2 shows an example of a liquid crystal display device according to the present invention. Two substrates (1) including a first substrate and a second substrate each have an alignment film (4), a transparent electrode layer (3a) serving as a common electrode and a color filter layer (2a) containing a specified pigment are disposed between one of the alignment films (4) and the substrate, a pixel electrode layer (3b) is disposed between the other alignment film and the substrate, the substrates are arranged so that the alignment films face each other, and a liquid crystal layer (5a) containing a specified liquid crystal composition is held between the substrates.

The two substrates in the display device are bonded together with a sealing material disposed in a peripheral region, and in many cases, a granular spacer or a resin spacer column formed by a photolithography method is disposed between the substrates in order to maintain a gap between the substrates.

(Liquid Crystal Layer)

The liquid crystal layer in the liquid crystal display device of the present invention preferably includes a liquid crystal composition which contains at least one compound selected from a compound group represented by general formula (LC1) to general formula (LC4),

[Chem. 3]

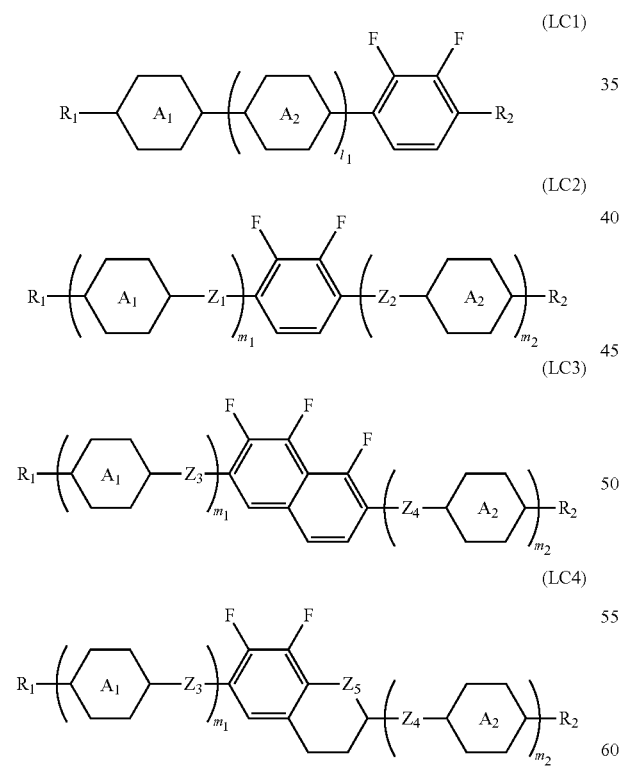

(in the formulae, $R_1$ and $R_2$ each independently represent an alkyl group having 1 to 15 carbon atoms, at least one $CH_2$ group in the alkyl group may be substituted by —O—, —CH=CH—, —CO—, —OCO—, —COO—, —C≡C—, —$CF_2$O—, or —O$CF_2$— so that oxygen atoms are not directly adjacent to each other, at least one hydrogen atom in the alkyl group may be arbitrarily substituted by a halogen, $A_1$ and $A_2$ each independently represent any one of the following structures,

[Chem. 4]

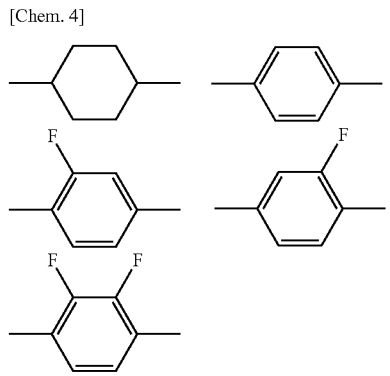

(at least one $CH_2$ group in a cyclohexane ring in the structures may be substituted by an oxygen atom, at least one CH group in a benzene ring in the structures may be substituted by a nitrogen atom, and at least one hydrogen atom in the structures may be substituted by Cl, $CF_3$, or $OCF_3$), $Z_1$ to $Z_4$ each independently represent a single bond, —CH=CH—, —C≡C—, —$CH_2CH_2$—, —$(CH_2)_4$—, —COO—, —O$CH_2$—, —$CH_2$O—, —O$CF_2$—, or —$CF_2$O—, $Z_5$ represents a $CH_2$ group or an oxygen atom, at least one of $Z_1$ and $Z_2$ present is not a single bond, $l_1$ represents 0 or 1, $m_1$ and $m_2$ each independently represent 0 to 3, and $m_1+m_2$ is 1, 2, or 3). Preferably, $R_1$ and $R_2$ each independently represent an alkyl group having 1 to 7 carbon atoms, an alkoxy group having 1 to 7 carbon atoms, or an alkenyl group having 2 to 7 carbon atoms.

Preferably, $A_1$ and $A_2$ each independently represent any one of the following structures.

[Chem. 5]

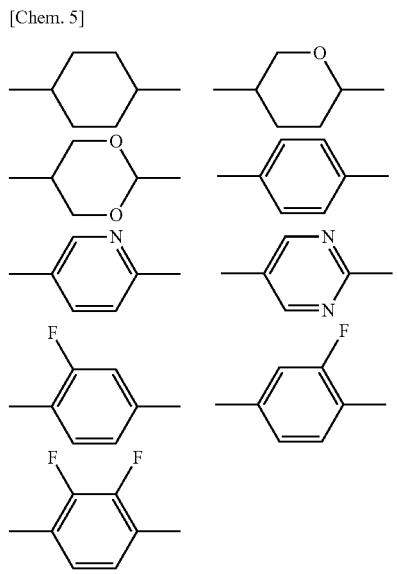

Preferably, $Z_1$ to $Z_4$ each independently represent a single bond, —$CH_2CH_2$—, —COO—, —O$CH_2$—, —$CH_2$O—, —O$CF_2$—, or —$CF_2$O—.

The liquid crystal composition preferably further contains at least one compound represented by general formula (LC5),

[Chem. 6]

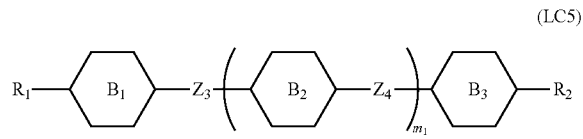

(LC5)

(in the formula, $R_1$ and $R_2$ each independently represent an alkyl group having 1 to 15 carbon atoms, at least one $CH_2$ group in the alkyl group may be substituted by —O—, —CH=CH—, —CO—, —OCO—, —COO—, —C≡C—, —$CF_2$O—, or —O$CF_2$— so that oxygen atoms are not directly adjacent to each other, at least one hydrogen atom in the alkyl group may be arbitrarily substituted by a halogen, $B_1$ to $B_3$ each independently represent any one of the following,

[Chem. 7]

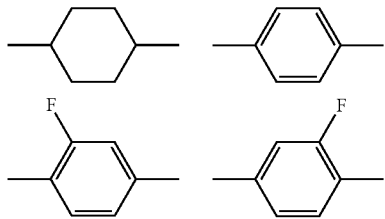

(in the formulae, at least one $CH_2CH_2$ group in a cyclohexane ring may be substituted by —CH=CH—, —$CF_2$O—, or —O$CF_2$—, and at least one CH group in a benzene ring may be substituted by a nitrogen atom), $Z_3$ and $Z_4$ each independently represent a single bond, —CH=CH—, —C≡C—, —$CH_2CH_2$—, —$(CH_2)_4$—, —COO—, —OCH$_2$—, —CH$_2$O—, —OCF$_2$—, or —CF$_2$O—, at least one of $Z_3$ and $Z_4$ is not a single bond, and $m_1$ represents 0 to 3).

Preferably, $R_1$ and $R_2$ each independently represent an alkyl group having 1 to 7 carbon atoms, an alkoxy group having 1 to 7 carbon atoms, or an alkenyl group having 2 to 7 carbon atoms.

Preferably, $B_1$ to $B_3$ each independently represent any one of the following structures.

[Chem. 8]

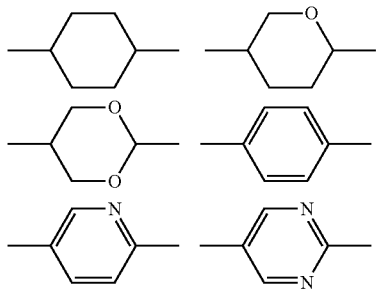

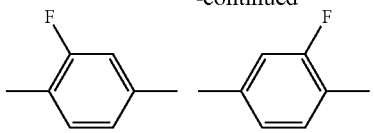

Preferably, $Z_3$ and $Z_4$ each independently represent a single bond, —$CH_2CH_2$—, —COO—, —OCH$_2$—, —CH$_2$O—, —OCF$_2$—, or —CF$_2$O—.

The general formula (LC1) more preferably represents at least one compound selected from the group consisting of compounds represented by general formula (LC1)-1 to general formula (LC1)-7 below,

[Chem. 9]

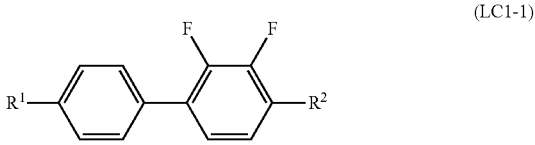
(LC1-1)

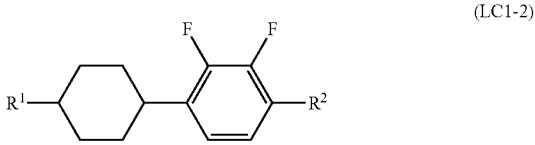
(LC1-2)

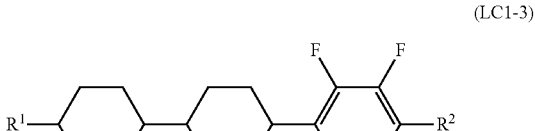
(LC1-3)

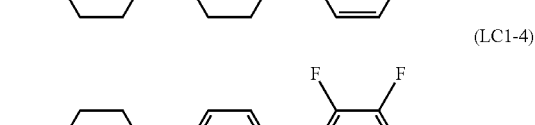
(LC1-4)

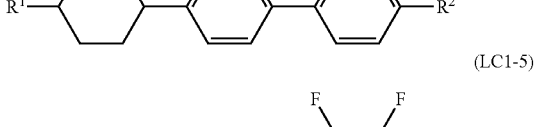
(LC1-5)

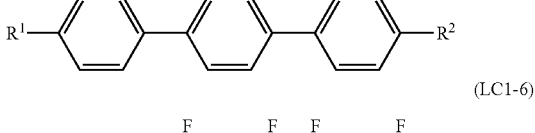
(LC1-6)

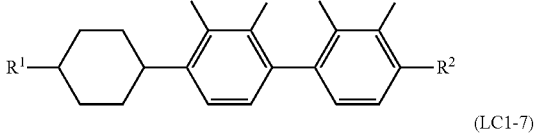
(LC1-7)

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

The general formula (LC2) more preferably represents at least one compound selected from the group consisting of compounds represented by general formula (LC2)-1 to general formula (LC2)-15 below,

[Chem. 10]

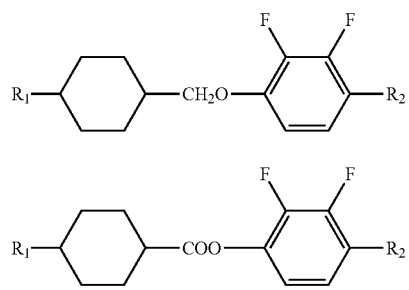
(LC2)-1

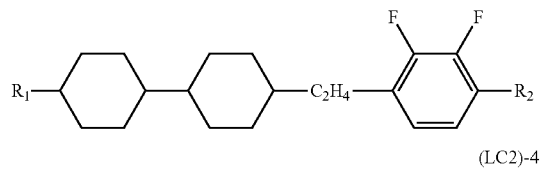
(LC2)-2

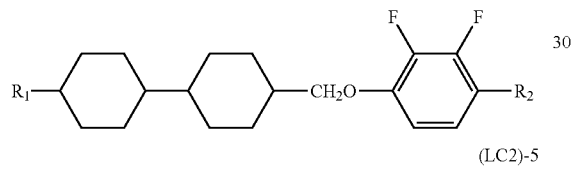
(LC2)-3

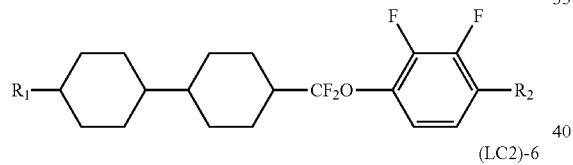
(LC2)-4

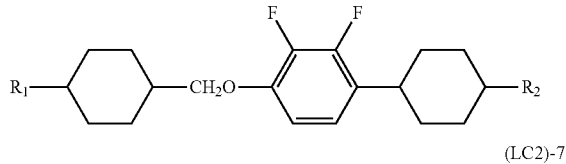
(LC2)-5

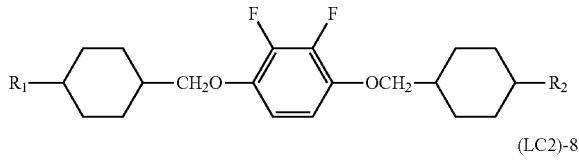
(LC2)-6

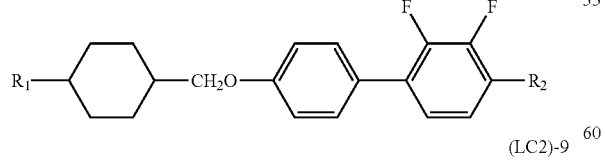
(LC2)-7

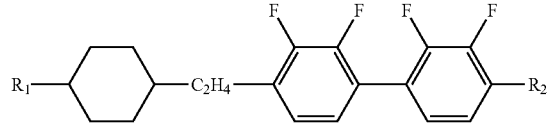
(LC2)-8

(LC2)-9

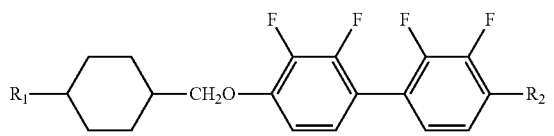

(LC2)-10

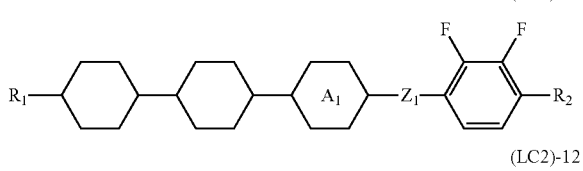

(LC2)-11

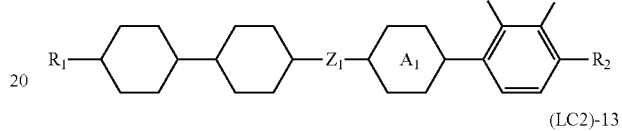

(LC2)-12

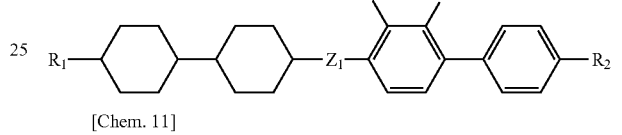

(LC2)-13

[Chem. 11]

(LC2-14)

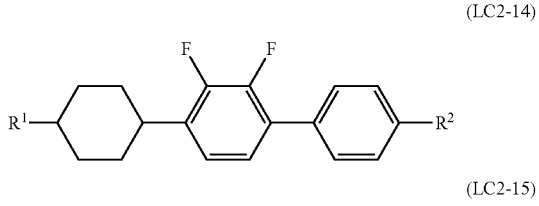

(LC2-15)

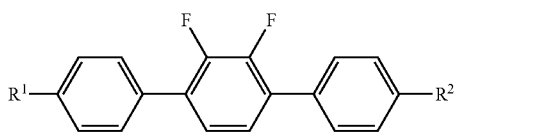

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms, and $Z^1$ represents —CH$_2$CH$_2$—, —OCH$_2$—, —CH$_2$O—, —OCF$_2$—, or —CF$_2$O—, and A$^1$ represents any one of the following structures).

[Chem. 12]

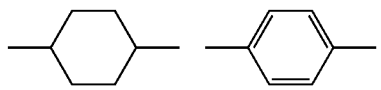

The general formula (LC3) more preferably represents at least one compound selected from the group consisting of compounds represented by general formula (LC3)-1 to general formula (LC3)-6 below, and the general formula (LC4) more preferably represents at least one compound selected from the group consisting of compounds represented by general formula (LC4)-1 to general formula (LC4)-4 below,

[Chem. 13]

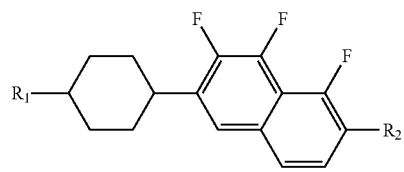
(LC3)-1

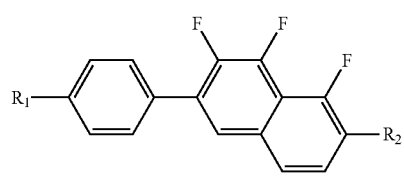
(LC3)-2

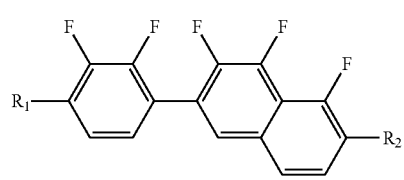
(LC3)-3

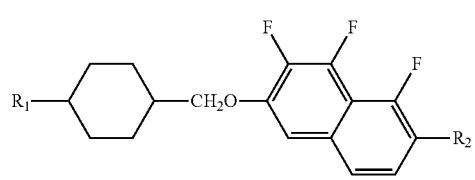
(LC3)-4

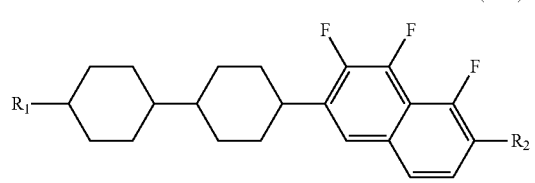
(LC3)-5

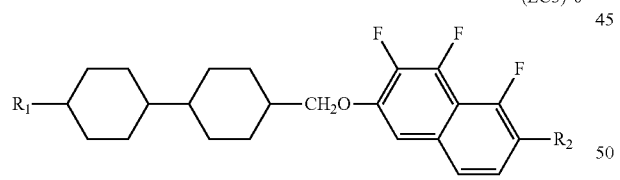
(LC3)-6

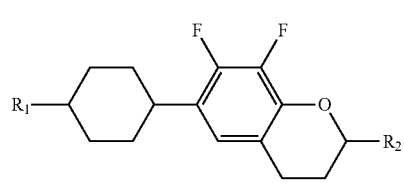
(LC4)-1

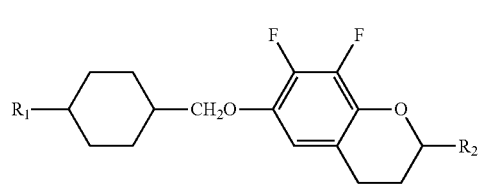
(LC4)-2

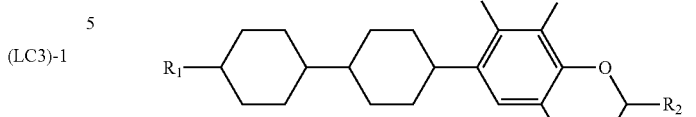
(LC4)-3

(LC4)-4

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

The general formula (LC5) more preferably represents at least one compound selected from the group consisting of compounds represented by general formula (LC5)-1 to general formula (LC5)-13 below,

[Chem. 14]

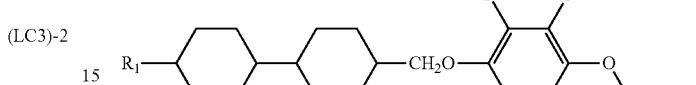
(LC5)-1

(LC5)-2

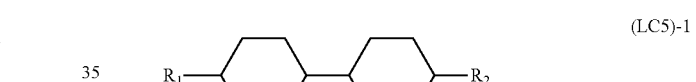
(LC5)-3

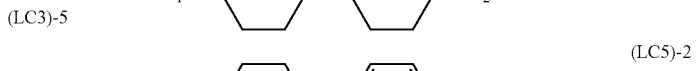
(LC5)-4

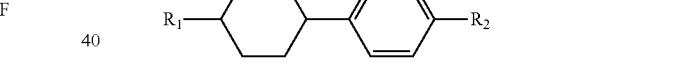
(LC5)-5

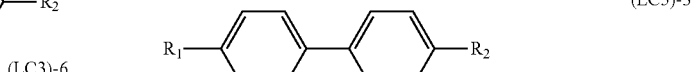
(LC5)-6

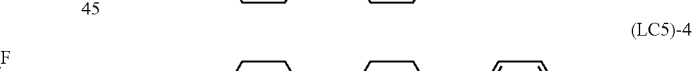
(LC5)-7

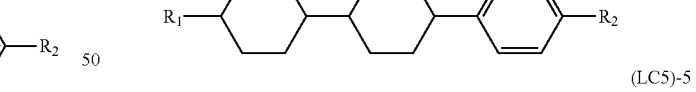

-continued (LC5)-8
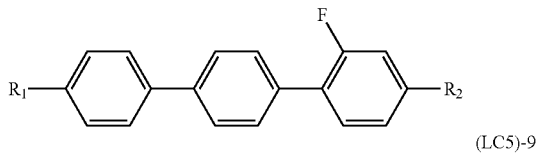

(LC5)-9
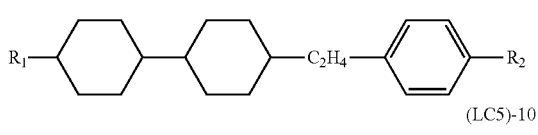

(LC5)-10
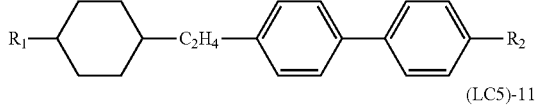

(LC5)-11
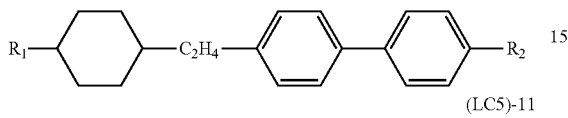

(LC5)-12
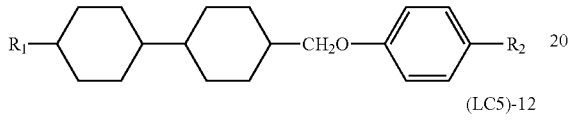

(LC5)-13
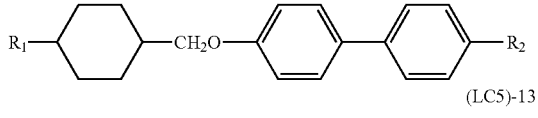

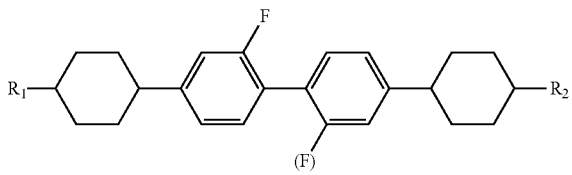

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

The liquid crystal composition layer may contain at least one polymerizable compound. The polymerizable compound is preferably a disk-shaped liquid crystal compound having a structure in which a benzene derivative, a triphenylene derivative, a truxene derivative, a phthalocyanine derivative, or a cyclohexane derivative serves as a central mother nucleus of a molecule and is radially substituted by linear alkyl groups, linear alkoxy groups, or substituted benzoyloxy groups as side chains.

Specifically, the polymerizable compound is preferably a polymerizable compound represented by general formula (PC1),

[Chem. 15]

(PC1)

(in the formula, $P_1$ represents a polymerizable functional group, $Sp_1$ represents a spacer group having 0 to 20 carbon atoms, $Q_1$ represents a single bond, —O—, —NH—, —NH-COO—, —OCONH—, —CH=CH—, —CO—, —COO—, —OCO—, —OCOO—, —OOCO—, —CH=CH—, —CH=CH—COO—, —OCO—CH=CH—, or —C≡C—, $n_1$ and $n_2$ each represent 1, 2, or 3, MG represents a mesogenic group or a mesogenity supporting group, $R_3$ represents a halogen atom, a cyano group, or an alkyl group having 1 to 25 carbon atoms, at least one $CH_2$ group in the alkyl group may be substituted by —O—, —S—, —NH—, —N(CH₃)—, —CO—, —COO—, —OCO—, —OCOO—, —SCO—, —COS—, or —C≡C— so that oxygen atoms are not directly adjacent to each other, and alternatively $R_3$ represents $P_2$—$Sp_2$-$Q_2$- (wherein $P_2$, $Sp_2$, and $Q_2$ independently represent the same meanings as $P_1$, $Sp_1$, and $Q_1$, respectively).

In the general formula (PC1), MG is more preferably represented by the following structure,

[Chem. 16]

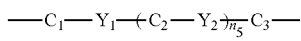

(in the formula, $C_1$ to $C_3$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group, the 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, and fluorene-2,7-diyl group may have as a substituent at least one F, Cl, $CF_3$, $OCF_3$, cyano group, alkyl group having 1 to 8 carbon atoms, alkoxy group, alkanoyl group, alkanoyloxy group, alkenyl group having 2 to 8 carbon atoms, alkenyloxy group, alkenoyl group, or alkenoyloxy group, $Y_1$ and $Y_2$ each independently represent —COO—, —OCO—, —CH₂CH₂—, —OCH₂—, —CH₂O—, —CH=CH—, —C≡C—, —CH=CHCOO—, —OCOCH=CH—, —CH₂CH₂COO—, —CH₂CH₂OCO—, —COOCH₂CH₂—, —OCOCH₂CH₂—, —CONH—, —NHCO—, or a single bond, and $n_5$ represents 0, 1, or 2), $Sp_1$ and $Sp_2$ each independently represent an alkylene group, the alkylene group may be substituted by at least one halogen atom or cyano group, at least one $CH_2$ group in the alkylene group may be substituted by —O—, —S—, —NH—, —N(CH₃)—, —CO—, —COO—, —OCO—, —OCOO—, —SCO—, —COS—, or —C≡C— so that oxygen atoms are not directly adjacent to each other, and $P_1$ and $P_2$ each independently represent a structure selected from the group consisting of compounds represented by general formula (PC1-a) to general formula (PC1-d) below,

[Chem. 17]

(PC1-a)

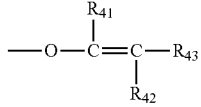

-continued

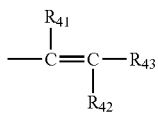
(PC1-b)

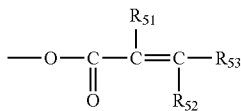
(PC1-c)

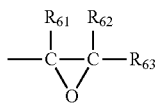
(PC1-d)

(in the formulae, $R_{41}$ to $R_{43}$, $R_{51}$ to $R_{53}$, and $R_{61}$ to $R_{63}$ each independently represent a hydrogen atom, a halogen atom, or an alkyl group having 1 to 5 carbon atoms).

More specifically, the general formula (PC1) preferably represents a polymerizable compound represented by general formula (PC1)-1 or general formula (PC1)-2,

[Chem. 18]

(PC1)-1

(PC1)-2

($P_1$, $Sp_1$, $Q_1$, $P_2$, $SP_2$, $Q_2$ and MG represent the same meanings as in the general formula (PC1), and $n_3$ and $n_4$ each independently represent 1, 2, or 3).

More specifically, the general formula (PC1) preferably represents at least one polymerizable compound selected from the group consisting of compounds represented by general formula (PC1)-3 to general formula (PC1)-11,

[Chem. 19]

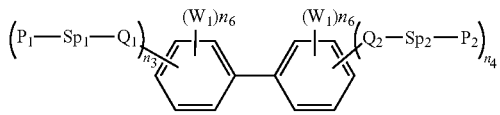
(PC1)-3

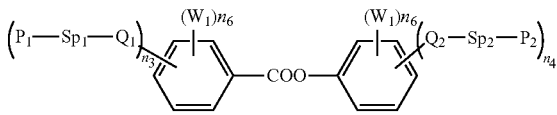
(PC1)-4

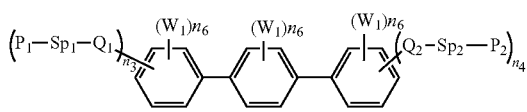
(PC1)-5

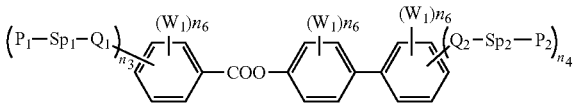
(PC1)-6

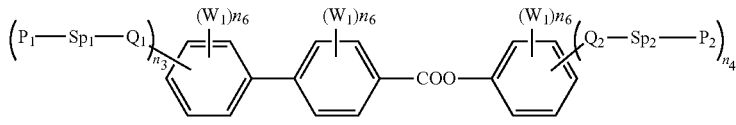
(PC1)-7

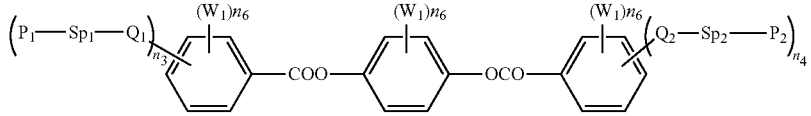
(PC1)-8

[Chem. 20]

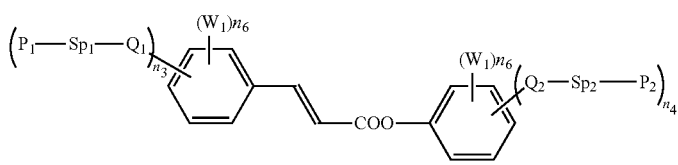
(PC1)-9

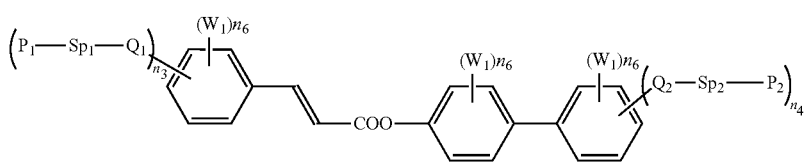
(PC1)-10

(PC1)-11

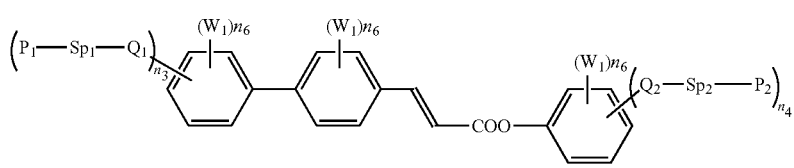

(in the formulae, $P_1$, $P_2$, $Sp_1$, $Sp_2$, $Q_1$, and $Q_2$ represent the same meanings as in the general formula (PC1), $W_1$ each independently represent F, $CF_3$, $OCF_3$, $CH_3$, $OCH_3$, an alkyl group having 2 to 5 carbon atoms, an alkoxy group, an alkenyl group, $COOW_2$, $OCOW_2$, or $OCOOW_2$ (wherein $W_2$ each independently represent a linear or branched alkyl group having 1 to 10 carbon atoms or an alkenyl group having 2 to 5 carbon atoms), $n_3$ each independently represent 1, 2, or 3, $n_4$ each independently represent 1, 2, or 3, $n_6$ each independently represent 0, 1, 2, 3, or 4, and $n_3+n_6$ on the same ring and $n_4+n_6$ on the same ring are 5 or less).

In the general formula (PC1) and the general formula (PC1)-1 to general formula (PC1)-11, $Sp_1$, $Sp_2$, $Q_1$, and $Q_2$ are preferably singe bonds. $n_3+n_4$ is preferably 1 to 3 and preferably 1 or 2. $P_1$ and $P_2$ are preferably formula (PC1-c). $W_1$ is preferably F, $CF_3$, $OCF_3$, $CH_3$, or $OCH_3$. $n_6$ is 1, 2, 3, or 4.

Specifically, the following compounds are preferred.

[Chem. 21]

(PC1-3a)

(PC1-3b)

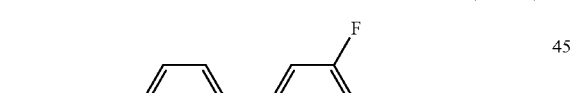

(PC1-3c)

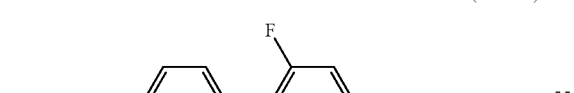

(PC1-3d)

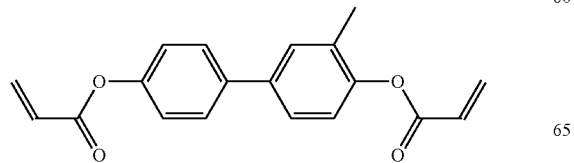

(PC1-3e)

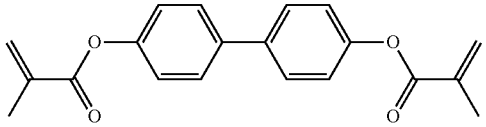

(PC1-3f)

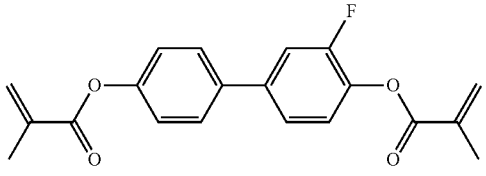

(PC1-3g)

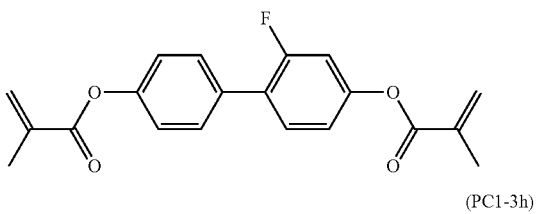

(PC1-3h)

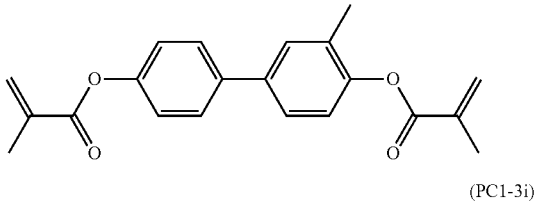

(PC1-3i)

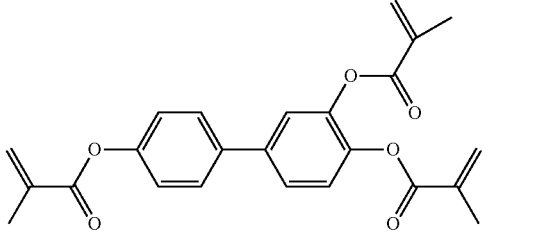

Further, a hydrogen atom in a benzene ring of (PC1-3a) to (PC1-3i) may be substituted by a fluorine atom.

Also, MG in the general formula (PC1) is preferably a disk-shaped liquid crystal compound represented by general formula (PC1)-9,

[Chem. 22]

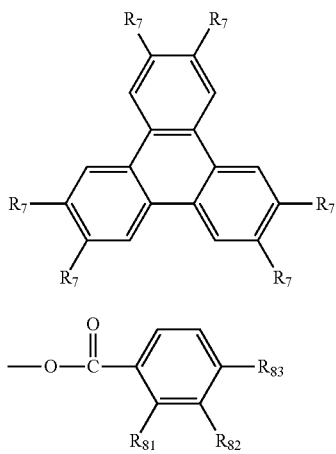

(PC1)-9

(PC1)-e (in the formula, $R_7$ each independently represent a substituent represented by $P_1$-$Sp_1$-$Q_1$ or general formula (PC1-e) (wherein $P_1$, $Sp_1$, and $Q_1$ represent the same meanings as in the general formula (PC1), $R_{81}$ and $R_{82}$ each independently represent a hydrogen atom, a halogen atom, or a methyl group, $R_{83}$ represents an alkoxy group having 1 to 20 carbon atoms, and at least one hydrogen atom in the alkoxy group is substituted by a substituent represented by the general formula (PC1-a) to (PC1-d)).

The amount of the polymerizable compound used is preferably 0.05 to 2.0% by mass.

The liquid crystal composition can be singly used for the above-described applications, and can further contain at least one antioxidant and at least one UV absorber.

(Color Filter)

A color filter according to the present invention includes a black matrix and at least RGB three-color pixel portions, the RGB three-color pixel portions including, as a colorant in a G pixel portion, a halogenated metal phthalocyanine pigment containing a metal selected as a central metal from the group consisting of Al, Si, Sc, Ti, V, Mg, Fe, Co, Ni, Zn, Ga, Ge, Y, Zr, Nb, In, Sn, and Pb, wherein when the central metal is trivalent, any one of a halogen atom, a hydroxyl group, and a sulfonic acid group is bonded to the central metal or the central metal is oxo- or thio-bridged, and when the central metal is a tetravalent metal, an oxygen atom or any two, which may be the same or different, selected from halogen atoms, hydroxyl groups, and sulfonic acid groups are bonded to the central metal. Also, the RGB three-color pixel portions preferably include, as colorants, a diketopyrrolopyrrole pigment and/or anionic red organic dye in a R pixel portion, and a ∈-type copper phthalocyanine pigment and/or cationic blue organic dye in a B pixel portion.

(G Pixel Portion)

As the halogenated metal phthalocyanine pigment in the G pixel portion, two groups of halogenated metal phthalocyanine pigments described below can be used.

(First Group)

Halogenated metal phthalocyanine pigments each containing, as a central metal, a metal selected from the group consisting of Al, Si, Sc, Ti, V, Mg, Fe, Co, Ni, Zn, Ga, Ge, Y, Zr, Nb, In, Sn, and Pb, and 8 to 16 halogen atoms bonded to benzene rings of a phthalocyanine molecule per molecule of phthalocyanine, wherein when the central metal is trivalent, any one of a halogen atom, a hydroxyl group, and a sulfonic acid group (—$SO_3H$) is bonded to the central metal, and when the central metal is a tetravalent metal, an oxygen atom or any two, which may be the same or different, selected from halogen atoms, hydroxyl groups, and sulfonic acid groups are bonded to the central metal.

(Second Group)

Pigments each composed of a halogenated metal phthalocyanine dimer having, as a constitutional unit, two molecules of halogenated metal phthalocyanine containing as a central metal a trivalent metal selected from the group consisting of Al, Sc, Ga, Y, and In, and 8 to 16 halogen atoms bonded to benzene rings of a phthalocyanine molecule per molecule of phthalocyanine, wherein the central metals in the constitutional unit are bonded to each other through a divalent atom group selected from the group consisting of an oxygen atom, a sulfur atom, sulfinyl (—SO—), and sulfonyl (—$SO_2$—).

In the halogenated metal phthalocyanine pigment used in the present invention, all halogen atoms bonded to benzene rings may be the same or different from each other. Also, different halogen atoms may be bonded to a benzene ring.

The halogenated metal phthalocyanine pigment used in the present invention in which among 8 to 16 halogen atoms per molecule of phthalocyanine, 9 to 15 halogen atoms bonded to the benzene rings of a phthalocyanine molecule are bromine atoms exhibits a yellowish light green color and is optimum for use in the green pixel portion of the color filter. The halogenated metal phthalocyanine pigment used in the present invention is insoluble or slightly soluble in water and an organic solvent. In addition, the halogenated metal phthalocyanine pigment used in the present invention may be a pigment (also referred to as a "crude pigment") not subjected to finishing treatment described below or a pigment subjected to finishing treatment.

The halogenated metal phthalocyanine pigments belonging to the first group and the second group can be represented by general formula (PIG-1) below.

[Chem. 23]

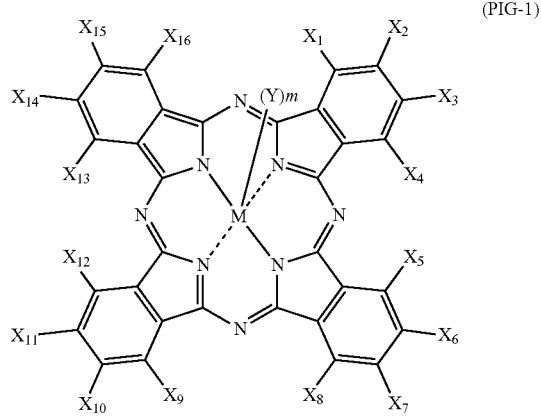

(PIG-1)

A halogenated metal phthalocyanine pigment belonging to the first group and represented by the general formula (PIG-1) is as follows.

In the general formula (PIG-1), $X_1$ to $X_{16}$ each represents a hydrogen atom, a chlorine atom, a bromine atom, or an iodine atom. The four X atoms bonded to a benzene ring may be the same or different. Among $X_1$ to $X_{16}$ bonded to the four benzene rings, 8 to 16 atoms are chlorine atoms, bromine atoms, or iodine atoms. M represents a central metal. Within a range of halogenated metal phthalocyanine pigments having the same Y and the same number m of Y, pigments having chlorine atoms, bromine atoms, and iodine atoms in a total number of less than 8 among the 16 atoms as $X_1$ to $X_{16}$ are blue, and similarly, pigments having chlorine atoms, bromine atoms, and iodine atoms in a total number of 8 or more among the 16 atoms as $X_1$ to $X_{16}$ increases in yellowness as the total number increases. Y bonded to the central metal M is a monovalent atom group selected from the group consisting of a halogen atom of any one of fluorine, chlorine, bromine, and iodine, an oxygen atom, a hydroxyl group, and a sulfonic acid group, and m represents the number of Y bonded to the central metal M and an integer of 0 to 2.

The value of m is determined by the valence of the central metal M. When the central metal M is a trivalent metal such as Al, Sc, Ga, Y, or In, m=1, and one selected from the group consisting of fluorine, chlorine, bromine, iodine, a hydroxyl group, and a sulfonic acid group is bonded to the central metal. When the central metal M is a tetravalent metal such as Si, Ti, V, Ge, Zr, or Sn, m=2, and an oxygen atom is bonded to the central metal or two selected from the group consisting of fluorine, chlorine, bromine, iodine, a hydroxyl group, and a sulfonic acid group are bonded to the central metal. When the central metal M is a divalent metal such as Mg, Fe, Co, Ni, Zn, Zr, Sn, or Pb, Y is absent.

A halogenated metal phthalocyanine pigment belonging to the second group and represented by the general formula (PIG-1) is as follows.

In the general formula (PIG-1), $X_1$ to $X_{16}$ are defined as the same as the above, and central metal M represents a trivalent metal selected from the group consisting of Al, Sc, Ga, Y, and In, m represents 1, and Y represents the following atom group.

[Chem. 24]

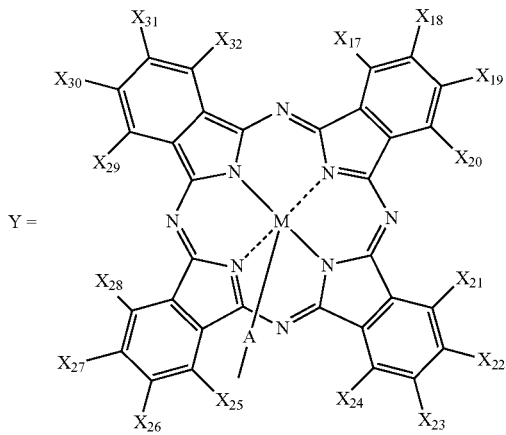

In a chemical structure of the atom group Y, the central metal is defined as the same as the above, and $X_{17}$ to $X_{32}$ are defined as the same as the above for $X_1$ to $X_{16}$ in the general formula (PIG-1). A represents a divalent atom group selected from the group consisting of an oxygen atom, a sulfur atom, sulfinyl (—SO—), and sulfonyl (—SO$_2$—). This represents that M in the general formula (PIG-1) and M in the atom group Y are bonded to each other through the divalent atom group A.

That is, the halogenated metal phthalocyanine pigment belonging to the second group is composed of a halogenated metal phthalocyanine dimer having, as a constitutional unit, two molecules of halogenated metal phthalocyanine which are bonded to each other through the divalent atom group.

Examples of the halogenated metal phthalocyanine pigments represented by the general formula (PIG-1) include the following (1) to (4).

(1) A halogenated metal phthalocyanine pigment such as a halogenated tin phthalocyanine pigment, a halogenated nickel phthalocyanine pigment, or a halogenated zinc phthalocyanine pigment, in which the central metal is a divalent metal selected from the group consisting of Mg, Fe, Co, Ni, Zn, Zr, Sn, and Pb, and 8 to 16 halogen atoms are bonded to the four benzene rings per molecule of phthalocyanine. Among these, a chlorinated/brominated zinc phthalocyanine pigment, such as C. I. Pigment Green 58, is particularly preferred.

(2) A halogenated metal phthalocyanine pigment such as halogenated chloroaluminum phthalocyanine, in which the central metal is a trivalent metal selected from the group consisting of Al, Sc, Ga, Y, and In, any one of a halogen atom, a hydroxyl group, and a sulfonic acid group is bonded to the central metal, and 8 to 16 halogen atoms are bonded to the four benzene rings per molecule of phthalocyanine.

(3) A halogenated metal phthalocyanine pigment such as halogenated oxytitanium phthalocyanine or halogenated oxyvanadium phthalocyanine, in which the central metal is a tetravalent metal selected from the group consisting of Si, Ti, V, Ge, Zr, and Sn, an oxygen atom or any two, which may be the same or different, selected from halogen atoms, hydroxyl groups, and sulfonic acid groups are bonded to the central metal, and 8 to 16 halogen atoms are bonded to the four benzene rings per molecule of phthalocyanine.

(4) A pigment composed of a halogenated metal phthalocyanine dimer, such as a halogenated μ-oxy-aluminum phthalocyanine dimer or a halogenated μ-thio-aluminum phthalocyanine dimer, in which a constitutional unit includes two molecules of halogenated metal phthalocyanine containing as the central metal a trivalent metal selected from the group consisting of Al, Sc, Ga, Y, and In, and 8 to 16 halogen atoms bonded to the four benzene rings per molecule of phthalocyanine, and the central metals of the constitutional unit are bonded to each other through a divalent atom group selected from the group consisting of an oxygen atom, a sulfur atom, sulfinyl, and sulfonyl.

(R Pixel Portion)

The R pixel portion preferably contains a diketopyrrolopyrrole pigment and/or anionic red organic dye. Preferred examples of the diketopyrrolopyrrole pigment include C. I. Pigment Red 254, 255, 264, and 272, and Orange 71 and 73, Red 254, 255, 264, and 272 are more preferred, and C. I. Pigment Red 254 is particularly preferred. Preferred examples of the anionic red organic dye include C. I. Solvent Red 124, and Acid Red 52 and 289, and C. I. Solvent Red 124 is particularly preferred.

(B Pixel Portion)

The B pixel portion preferably contains a ∈-type copper phthalocyanine pigment and/or cationic blue organic dye. The ∈-type copper phthalocyanine pigment is C. I. Pigment Blue 15:6. Preferred examples of the cationic blue organic dye include C. I. Solvent Blue 2, 3, 4, 5, 6, 7, 23, 43, 72, and 124, and C. I. Basic Blue 7 and 26, C. I. Solvent Blue 7 and Basic Blue 7 are more preferred, and C. I. Solvent Blue 7 is particularly preferred.

The RGB three-color pixel portions preferably include, as colorants, C. I. Solvent Red 124 in the R pixel portion, a halogenated phthalocyanine pigment in the G pixel portion, and C. I. Solvent Blue 7 in the B pixel portion, the halogenated metal phthalocyanine pigment containing as a central metal a metal selected from the group consisting of Al, Si, Sc, Ti, V, Mg, Fe, Co, Ni, Zn, Ga, Ge, Y, Zr, Nb, In, Sn, and Pb, wherein when the central metal is trivalent, any one of a halogen atom, a hydroxyl group, and a sulfonic acid group is bonded to the central metal or the central metal is oxo- or thio-bridged, and when the central metal is a tetravalent metal, an oxygen atom or any two, which may be the same or different, selected from halogen atoms, hydroxyl groups, and sulfonic acid groups are bonded to the central metal or the central metal is oxo- or thio-bridged.

Also, the RGB three-color pixel portions preferably include, as colorants, C. I. Pigment Red 254 in the R pixel portion, a halogenated metal phthalocyanine pigment in the G pixel portion, and C. I. Pigment Blue 15:6 in the B pixel portion, the halogenated metal phthalocyanine pigment containing as a central metal a metal selected from the group consisting of Al, Si, Sc, Ti, V, Mg, Fe, Co, Ni, Zn, Ga, Ge, Y, Zr, Nb, In, Sn, and Pb, wherein when the central metal is trivalent, any one of a halogen atom, a hydroxyl group, and a sulfonic acid group is bonded to the central metal or the central metal is oxo- or thio-bridged, and when the central metal is a tetravalent metal, an oxygen atom or any two, which may be the same or different, selected from halogen atoms, hydroxyl groups, and sulfonic acid groups are bonded to the central metal.

The RGB three-color pixel portions preferably further include, as a colorant in the R pixel portion, at least one organic dye/pigment selected from the group consisting of C. I. Pigment Red 177, 242, 166, 167, and 179, C. I. Pigment Orange 38 and 71, C. I. Pigment Yellow 150, 215, 185, 138, and 139, C. I. Solvent Red 89, C. I. Solvent Orange 56, and C. I. Solvent Yellow 21, 82, 83:1, 33, and 162.

The RGB three-color pixel portions preferably further include, as a colorant in the G pixel portion, at least one organic dye/pigment selected from the group consisting of C. I. Pigment Yellow 150, 215, 185, and 138, and C. I. Solvent Yellow 21, 82, 83:1, and 33.

The RGB three-color pixel portions preferably further include, as a colorant in the B pixel portion, at least one organic dye/pigment selected from the group consisting of C. I. Pigment Blue 1, C. I. Pigment Violet 23, C. I. Basic Blue 7, C. I. Basic Violet 10, C. I. Acid Blue 1, 90, and 83, and C. I. Direct Blue 86.

Also, the color filter includes a black matrix, RGB three-color pixel portions, and a Y pixel portion, and preferably contains, as a colorant in the Y pixel portion, at least one yellow organic dye/pigment selected from the group consisting of C. I. Pigment Yellow 150, 215, 185, 138, and 139, and C. I. Solvent Yellow 21, 82, 83:1, 33, and 162.

In the color filter, the color filter pixel portions can be formed by a generally known method. A typical method for forming pixel portions is a photolithography method in which a photocurable composition described below is applied to a surface of a color filter transparent substrate on the side provided with a black matrix and then dried by heating (prebaked), the photocurable compound is cured in portions corresponding to the pixel portions by pattern exposure under irradiation with ultraviolet light through a photomask, unexposed portions are developed with a developer, and then non-pixel portions are removed to fix the pixel portions to the transparent substrate. This method forms the pixel portions each composed of a cured color film of the photocurable composition on the transparent substrate.

A photocurable composition described below is prepared for each of R pixels, G pixels, B pixels, and if required, other color pixels such as Y pixels or the like, and the above-described operation is repeated to produce a color filter having color pixel portions of the R pixels, G pixels, B pixels, and Y pixels at predetermined positions.

Examples of a method for applying each photocurable composition described below to the transparent substrate of glass or the like include a spin coating method, a slit coating method, a roll coating method, an ink jet method, and the like.

The drying conditions of a coating film of the photocurable composition applied to the transparent substrate are generally 50° C. to 150° C. and about 1 to 15 minutes, depending on the type and mixing ratio of each component, or the like. Light used for photocuring the photocurable composition is preferably ultraviolet light within a wavelength range of 200 to 500 nm or visible light. Various light sources which emit light within this wavelength range can be used.

Examples of a development method include a puddle method, a dipping method, a spray method, and the like. After exposure and development of the photocurable composition, the transparent substrate on which necessary color pixel portions have been formed is washed with water and dried. The resultant color filter is heat-treated (post baked) at 90° C. to 280° C. for a predetermined time using a heating apparatus such as a hot plate, an oven, or the like to remove volatile components in the color coating film and, at the same time, to heat-cure an unreacted photocurable compound remaining in the cured color coating film of the photocurable composition, completing the color filter.

By using the colorants for the color filter of the present invention in combination with the liquid crystal composition of the present invention, it is possible to provide a liquid crystal display device capable of preventing a decrease in voltage holding ratio (VHR) of the liquid crystal layer and an increase in ion density (ID) and resolving the problems of display defects such as white spots, alignment unevenness, image sticking, and the like.

A method for producing the photocurable composition is generally a method in which a dye and/or pigment composition for the color filter of the present invention, an organic solvent, and a dispersant are used as essential components, these components are mixed and uniformly dispersed by stirring to prepare a pigment dispersion for forming a pixel portion of the color filter, and a photocurable compound and, if required, a thermoplastic resin, a photopolymerization initiator, and the like are added to the dispersion to produce the photocurable composition.

Examples of the organic solvent used include aromatic solvents such as toluene, xylene, methoxybenzene, and the like; acetic acid ester solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, diethylene glycol butyl ether acetate, and the like; propionate solvents such as ethoxyethyl propionate, and the like; alcohol solvents such as methanol, ethanol, and the like; ether solvents such as butyl cellosolve, propylene glycol monomethyl ether, diethylene glycol ethyl ether, diethylene glycol dimethyl ether, and the like; ketone solvents such as methyl ethyl ketone, methyl isobutyl ketone, cyclohexanone, and the like; aliphatic hydrocarbon solvents such as hexane and the like; nitrogen compound solvents such as N,N-dimethylformamide, γ-butyrolactam, N-methyl-2-pyrrolidone, aniline, pyridine, and the like; lactone solvents such as γ-butyrolactone and the like; and carbamic acid esters such as a mixture of methyl carbamate and ethyl carbamate at 48:52, and the like.

Examples of the dispersant which can be used include dispersants such as BYK Chemie DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919; Efka Chemicals Company Efka 46, Efka 47, Efka 452, Efka LP4008, Efka 4009, Efka LP4010, Efka LP4050 and LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503; Lubrizol Corporation Solsperse 3000, Solsperse 9000, Solsperse 13240, Solsperse 13650, Solsperse 13940, Solsperse 17000 and 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000; and Ajimonoto Co., Ltd. Ajisper PB711, Ajisper PB821, Ajisper PB822, Ajisper PB814, Ajisper PN411, and Ajisper PA111; and synthetic resins which are liquid at room temperature and water-insoluble, such as acryl resins, urethane resins, alkyd resins, natural rosins such as wood rosin, gum rosin, tall oil rosin, and the like, modified rosins such as polymerized rosin, disproportionated rosin, hydrogenated rosin, oxidized rosin, maleinized rosin, and the like, rosin derivatives such as rosin amine, lime rosin, rosin alkyleneoxide adduct, rosin alkyd adduct, rosin-modified phenol, and the like. Addition of any one of the dispersants and resins also contributes to a decrease in flocculation and improvements in dispersion stability of pigments and viscosity characteristics of a dispersion.

Examples of a dispersion aid which can be used include organic pigment derivatives such as phthalimide methyl derivatives, sulfonic acid derivatives, N-(dialkylamino)methyl derivative, N-(dialkylaminoalkyl)sulfonic amide derivatives, and the like. Of course, these derivatives can be used in combination of two or more different types.

Examples of the thermoplastic resin used for preparing the photocurable composition include urethane resins, acryl resins, polyamide resins, polyimide resins, styrene-maleic acid resins, styrene-maleic anhydride resins, and the like.

Examples of the photocurable compound include difunctional monomers such as 1,6-hexanediol diacrylate, ethylene glycol diacrylate, neopentyl glycol diacrylate, triethylene glycol diacrylate, bis(acryloxyethoxy)bisphenol A, 3-methylpentanediol diacrylate, and the like; polyfunctional monomers with relatively low molecular weight, such as trimethylolpropane triacrylate, pentaerythritol triacrylate, tris[2-(meth)acryloyloxyethyl) isocyanurate, dipentaerythritol hexaacrylate, dipentaerythritol pentaacrylate, and the like; and polyfunctional monomers with relatively high molecular weight, such as polyester acrylate, polyurethane acrylate, polyether acrylate, and the like.

Examples of the photopolymerization initiator include acetophenone, benzophenone, benzyl dimethyl ketal, benzoyl peroxide, 2-chlorothioxanthone, 1,3-bis(4'-azidobenzal)-2-propane, 1,3-bis(4'-azidobenzal)-2-propane-2'-sulfonic acid, 4,4'-diazidostilbene-2,2'-disulfonic acid, and the like. Examples of a commercially available photopolymerization initiator include BASF Corporation "Irgacure (trade name)-184", "Irgacure (trade name)-369", "Darocur (trade name)-1173", and BASF Corporation "Lucirin-TPO", Nippon Kayaku Co., Ltd. "Kayacure (trade name) DETX" and "Kayacure (trade name) OA", Sutoufa Chemical Co., "Baikyua 10" and "Baikyua 55", Akzo Co., Ltd. "Trigonal PI", Sandozu Co., Ltd. "Sandorei 1000", Apujon Co., Ltd. "Deep", Kurogane Kasei Co., Ltd. "Biimidazole", and the like.

The photopolymerization initiator can be combined with a known photosensitizer in common use. Examples of the photosensitizer include amines, ureas, sulfur atom-containing compounds, phosphorus atom-containing compounds, chlorine atom-containing compounds, nitriles, other nitrogen atom-containing compounds, and the like. These can be used alone or in combination of two or more.

The ratio of the photopolymerization initiator mixed is not particularly limited but is preferably in a range of 0.1% to 30% on a mass basis relative to a compound having a photopolymerizable or photocurable functional group. With the ratio less than 0.1%, sensitivity during photocuring tends to be decreased, while with the ratio exceeding 30%, crystals of the photopolymerization initiator may be precipitated when a coating film of a pigment-dispersed resist is dried, thereby causing deterioration in the physical properties of the coating film.

By using each of the above-described materials, on a mass basis, 300 to 1000 parts of the organic solvent and 1 to 100 parts of the dispersant relative to 100 parts of the color filter dye and/or pigment composition of the present invention are uniformly dispersed by stirring to prepare the dye/pigment solution. Then, to the pigment dispersion, the thermoplastic resin and the photocurable compound in a total of 3 to 20 parts per part of the pigment composition for the color filter of the present invention, 0.05 to 3 parts of the photopolymerization initiator per part of the photocurable compound, and if required, the organic solvent are added and uniformly dispersed by stirring to produce the photocurable composition for forming each of the color filter pixel portions.

A known organic solvent or aqueous alkali solution in common use can be used as the developer. In particular, when the photocurable composition contains the thermoplastic resin or the photocurable compound at least one of which has an acid value and exhibits alkali solubility, washing with an aqueous alkali solution is effective for forming the color filter pixel portions.

Although the method for producing the color filter pixel portions by the photolithography method is described in detail, each of the color filter pixel portions prepared by using the color filter pigment composition of the present invention may be formed by another method such as an electrodeposition method, a transfer method, a micelle electrolysis method, a PVED (Photovoltaic Electrodeposition) method, an ink jet method, a reverse printing method, a heat curing method, or the like, thereby producing the color filter.

(Alignment Film)

In the liquid crystal display device of the present invention, when the alignment film for aligning the liquid crystal composition is required to be provided on the surface of each of the first and second substrates which is in contact with the liquid crystal composition, the alignment film is disposed between the color filter and the liquid crystal layer. However, even in the case of a thick film, the alignment film has a thickness of as small as 100 nm or less so as not to completely cut off the interaction between the colorants such as pigments or the like, which constitute the color filter, and the liquid crystal compound constituting the liquid crystal layer.

The liquid crystal display device without using the alignment film has greater interaction between the colorants such as pigments or the like, which constitute the color filter, and the liquid crystal compound constituting the liquid crystal layer.

Usable examples of an alignment film material include transparent organic materials such as polyimide, polyamide, BCB (benzocyclobutene polymer), polyvinyl alcohol, and the like. In particular, it is preferred to use a polyimide alignment film produced by imidizing a polyamic-acid synthesized from diamine such as an aliphatic or alicyclic diamine, for example, p-phenylenediamine, 4,4'-diaminodiphenylmethane, or the like, and an aliphatic or alicyclic tetracarboxylic anhydride, such as butanetetracarboxylic anhydride, 2,3,5-tricarboxycyclopentylacetic anhydride, or the like, or an aromatic tetracarboxylic anhydride such as pyromellitic dianhydride or the like. In this case, rubbing is generally used as an alignment imparting method, but when the alignment film is used as a vertical alignment film, it can be used without imparting alignment.

A material containing a compound containing chalcone, cinnamate, cinnamoyl, or an azo group can be used as the alignment film material, and this may be used in combination with a material such as polyimide, polyamide, or the like. For this alignment film, rubbing may be used or a light alignment technique may be used.

The alignment film is generally formed as a resin film by applying the alignment film material to the substrate using a method such as a spin coating method or the like, but a uniaxial stretching method, a Langmuir-Blodgett method, or the like can also be used.

(Transparent Electrode)

In the liquid crystal display device of the present invention, a conductive metal oxide can be used as a material of the transparent electrode. Usable examples of the metal oxide include indium oxide ($In_2O_2$), tin oxide ($SnO_2$), zinc oxide (ZnO), indium-tin oxide ($In_2O_2$—$SnO_2$), indium-zinc oxide ($In_2O_2$—ZnO), niobium-added titanium dioxide ($Ti_{1-x}Nb_xO_2$), fluorine-doped tin oxide, graphene nanoribbons or metal nanowires, and the like. But zinc oxide (ZnO), indium-tin oxide ($In_2O_2$—$SnO_2$), or indium-zinc oxide ($In_2O_2$—ZnO) is preferred. The transparent conductive film can be patterned by a method such as a photo-etching method, a method using a mask, or the like.

EXAMPLES

A best mode of the present invention is partially described in detail below by way of examples, but the present invention is not limited to these examples. In the examples and comparative examples below, "%" in a composition represents "% by mass".

The physical properties of a liquid crystal composition are represented as follows.

$T_{N-i}$: nematic-isotropic liquid phase transition temperature (° C.) as liquid crystal phase upper limit temperature $\Delta \in$: dielectric constant anisotropy $\Delta n$: refractive index anisotropy $\eta$: viscosity at 20° C. (mPa·s)

$d_{gap}$: gap between first substrate and second substrate of cell (μm)

VHR: voltage holding ratio at 70° C. (%)

(a value by % representing a ratio of a measured voltage to an initial applied voltage, the measured voltage being measured using a liquid crystal composition injected into a cell having a cell thickness of 3.5 μm under the conditions of 5 V applied, a frame time of 200 ms, and a pulse width of 64 μs)

ID: ion density at 70° C. (pC/cm$^2$)

(a value of ion density measured using a liquid crystal composition injected into a cell having a cell thickness of 3.5 μm and MTR-1 (manufactured by Toyo Corporation) under the conditions of 20 V applied and a frequency of 0.05 Hz)

Compounds are represented by abbreviations below.

n (Number) at end $C_nH_{2n+1}$—

-2- —$CH_2CH_2$—

-10- —$CH_2O$-

-01- -$OCH_2$—

-0n -$OC_nH_{2n+1}$

-1=1- —HC=CH—

-V0- —C00-

-ndm- $C_nH_{2n+1}$—HC=CH—$(CH_2)_{m-1}$—

[Chem. 25]

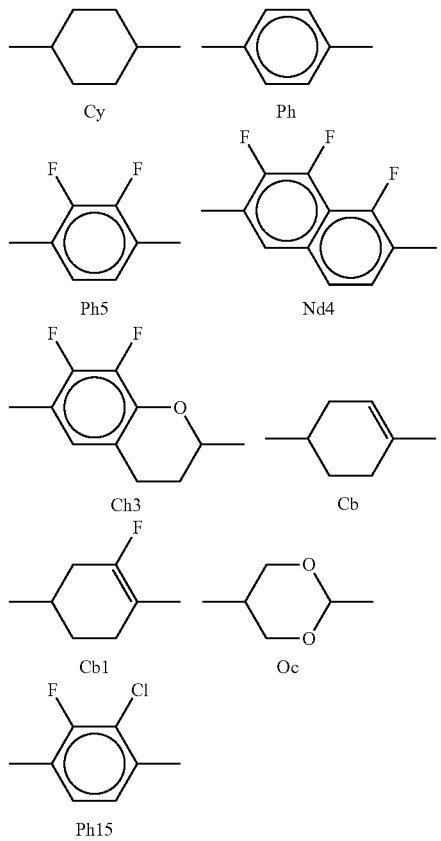

Image sticking of the liquid crystal display device was evaluated by display of a predetermined fixed pattern within a display area for 1000 hours and then uniform display over the entire screen to visually observe the level of residual image of the fixed pattern based on the following 4 levels:

A: No residual image

B: Slight residual image at an allowable level

C: Residual image at an unallowable level

D: Significant residual image

[Formation of Color Filter]

[Preparation of Colored Composition]

[Red Dye Colored Composition 1]

In a polymer bottle, 10 parts of red dye 1 (C. I. Solvent Red 124) was placed, and 55 parts of propylene glycol monomethyl ether acetate and SEPR beads of 0.3 to 0.4 mm in diameter were added, and the resultant mixture was dispersed with a paint conditioner (manufactured by Toyo Seiki Co., Ltd.) for 4 hours and then filtered with a 5 μm filter to produce a dye colored solution. Then, 75.00 parts of the dye colored solution, 5.50 parts of polyester acrylate resin (Aronix (trade name) M7100 manufactured by Toa Gosei Chemical Industry Co., Ltd.), 5.00 parts of dipentaerythritol hexaacrylate (KAYARAD (trade name) DPHA, manufactured by Nippon Kayaku Co., Ltd.), 1.00 part of benzophenone (KAYACURE (trade name) BP-100, manufactured by Nippon Kayaku Co., Ltd.), and 13.5 parts of Ucar Ester EEP were stirred with a dispersion stirrer and then filtered with a filter having a pore size of 1.0 µm to produce red dye colored composition 1.

[Red Dye Colored Composition 2]

Red dye colored composition 2 was produced by the same method as described above using 8 parts of the red dye 1 (C. I. Solvent Red 124) and 2 parts of yellow dye 1 (C. I. Solvent Yellow 21) in place of 10 parts of the red dye 1 of the red dye colored composition 1.

[Red Dye Colored Composition 3]

Red dye colored composition 3 was produced by the same method as described above using 10 parts of red dye 2 (C. I. Solvent Red 1) in place of 10 parts of the red dye 1 of the red dye colored composition 1.

[Green Dye Colored Composition 1]

Green dye colored composition 1 was produced by the same method as described above using 10 parts of green dye 1 (C. I. Solvent Green 7) in place of 10 parts of red dye 1 in the red dye colored composition 1.

[Blue Dye Colored Composition 1]

Blue dye colored composition 1 was produced by the same method as described above using 10 parts of blue dye 1 (C. I. Solvent Blue 7) in place of 10 parts of the red dye 1 of the red dye colored composition 1.

[Blue Dye Colored Composition 2]

Blue dye colored composition 2 was produced by the same method as described above using 7 parts of the blue dye 1 (C. I. Solvent Blue 7) and 3 parts of violet dye 1 (C. I. Basic Violet 10) in place of 10 parts of the blue dye 1 of the blue dye colored composition 1.

[Blue Dye Colored Composition 3]

Blue dye colored composition 3 was produced by the same method as described above using 10 parts of blue dye 2 (C. I. Solvent Blue 12) in place of 7 parts of the blue dye 1 and 3 parts of the violet dye 1 of the blue dye colored composition 2.

[Yellow Dye Colored Composition 1]

Yellow dye colored composition 1 was produced by the same method as described above using 10 parts of yellow dye 2 (C. I. Solvent Yellow 21) in place of 10 parts of the red dye 1 of the red dye colored composition 1.

[Yellow Dye Colored Composition 2]

Yellow dye colored composition 2 was produced by the same method as described above using 10 parts of yellow dye 4 (C. I. Solvent Yellow 2) in place of 10 parts of the yellow dye 1 of the yellow dye colored composition 1.

[Red Pigment Colored Composition 1]

In a polymer bottle, 10 parts of red pigment 1 (C. I. Pigment Red 254, "IRGAPHOR RED BT-CF" manufactured by BASF Corporation) was placed, and 55 parts of propylene glycol monomethyl ether acetate, 7.0 parts of DISPERBYK LPN21116 (manufactured by BYK Chemie Corporation), and zirconia beads "ER-120S" of 0.3 to 0.4 mm in diameter manufactured by Saint-Gobain K. K. were added, and the resultant mixture was dispersed with a paint conditioner (manufactured by Toyo Seiki Co., Ltd.) for 4 hours and then filtered with a 1 µm filter to produce a pigment-dispersed solution.

Then, 75.00 parts of the pigment-dispersed solution, 5.50 parts by polyester acrylate resin (Aronix (trade name) M7100 manufactured by Toa Gosei Chemical Industry Co., Ltd.), 5.00 parts of dipentaerythritol hexaacrylate (KAYARAD (trade name) DPHA, manufactured by Nippon Kayaku Co., Ltd.), 1.00 part of benzophenone (KAYACURE (trade name) BP-100, manufactured by Nippon Kayaku Co., Ltd.), and 13.5 parts of Ucar Ester EEP were stirred with a dispersion stirrer and then filtered with a filter having a pore size of 1.0 µm to produce red pigment colored composition 1.

[Red Pigment Colored Composition 2]

Red pigment colored composition 2 was produced by the same method as described above using 6 parts of the red pigment 1, 2 parts of red pigment 2 (C. I. Pigment Red 177 manufactured by DIC Corporation, FASTOGEN SUPER RED ATY-TR), and 2 parts of yellow pigment 2 (C. I. Pigment Yellow 139) in place of 10 parts of the red pigment 1 of the red pigment colored composition 1.

[Green Pigment Colored Composition 1]

Green pigment colored composition 1 was produced by the same method as described above using 10 parts of green pigment 1 (halogenated aluminum phthalocyanine (AlClPcBr14ClH)) in place of 10 parts of the red pigment 1 of the red pigment colored composition 1.

[Green Pigment Colored Composition 2]

Green pigment colored composition 2 was produced by the same method as described above using 10 parts of green pigment 2 (halogenated zinc phthalocyanine (ZnPcBr14ClH)) in place of 10 parts of the green pigment 1 of the green pigment colored composition 1.

[Green Pigment Colored Composition 3]

Green pigment colored composition 3 was produced by the same method as described above using 6 parts of green pigment 3 (C. I. Pigment Green 58, manufactured by DIC Corporation, FASTOGEN GREEN A110) and 4 parts of yellow pigment 1 (C. I. Pigment Yellow 150, manufactured by LANXESS Com., FANCHON FAST YELLOW E4GN) in place of 10 parts of the green pigment 1 of the green pigment colored composition 1.

[Green pigment colored composition 4]

Green pigment colored composition 4 was produced by the same method as described above using 4 parts of green pigment 4 (C. I. Pigment Green 58, manufactured by DIC Corporation, FASTOGEN GREEN A310) and 6 parts of yellow pigment 3 (C. I. Pigment Yellow 138) in place of 6 parts of the green pigment 3 and 4 parts of the yellow pigment 1 of the green pigment colored composition 3.

[Blue Pigment Colored Composition 1]

Blue pigment colored composition 1 was produced by the same method as described above using 9 parts of blue pigment 1 (C. I. Pigment Blue 15:6, manufactured by DIC Corporation, "FASTOGEN BLUE EP-210") and 1 part of violet pigment 1 (C. I. Pigment Violet 23) in place of 10 parts of the red pigment 1 of the red pigment colored composition 1.

[Blue Pigment-Dye Colored Composition 2]

Blue pigment-dye colored composition 2 was produced by the same method as described above using 1 part of violet dye 1 (C. I. Basic Violet 10) in place of 1 part of the violet pigment 1 of the blue pigment colored composition 1.

[Yellow Pigment Colored Composition 1]

Yellow pigment colored composition 1 was produced by the same method as described above using 10 parts of yellow pigment 1 (C. I. Pigment Yellow 150, manufactured by LANXESS Com., FANCHON FAST YELLOW E4GN) in place of 10 parts of the red pigment 1 of the red pigment colored composition 1.

[Formation of Color Filter]

The red colored composition was applied to a thickness of 2 µm by spin coating on a glass substrate on which a black matrix had been previously formed. After drying at 70° C. for 20 minutes, stripe-shaped pattern exposure was performed with ultraviolet light through a photomask using an exposure apparatus provided with a super-high pressure mercury lamp. Then, spray development with an alkali developer for 90 seconds, washing with ion exchange water, and air drying were performed. Further, post baking was performed in a clean oven at 230° C. for 30 minutes to form red pixels as a stripe-shaped color layer on the transparent substrate.

Next, similarly, the green colored composition was applied to a thickness of 2 μm by spin coating. After drying, a stripe-shaped color layer was formed in a position deviated from the red pixels by exposure with an exposure apparatus and development, thereby forming green pixels adjacent to the red pixels.

Next, similarly, the blue colored composition was applied to a thickness of 2 μm by spin coating, forming blue pixels adjacent to the red pixels and the green pixels. As a result, a color filter having stripe-shaped pixels of the three colors of red, green, and blue was produced.

If required, similarly, the yellow colored composition was applied to a thickness of 2 μm by spin coating, forming yellow pixels adjacent to the red pixels, the green pixels and the blue pixels. As a result, a color filter having stripe-shaped pixels of the four colors of red, green, blue, and yellow was produced.

Color filters 1 to 4 and comparative color filter 1 were formed by using the dye colored compositions or pigment colored compositions shown in Table 1.

TABLE 1

| | Color filter 1 | Color filter 2 | Color filter 3 | Color filter 4 | Comparative Color filter 1 |
|---|---|---|---|---|---|
| R pixel portion | Red dye colored composition 1 | Red dye colored composition 2 | Red pigment colored composition 1 | Red pigment colored composition 2 | Red dye colored composition 3 |
| G pixel portion | Green pigment colored composition 1 | Green pigment colored composition 2 | Green pigment colored composition 3 | Green pigment colored composition 4 | Green dye colored composition 1 |
| B pixel portion | Blue dye colored composition 1 | Blue dye colored composition 2 | Blue pigment colored composition 1 | Blue pigment-dye colored composition 2 | Blue dye colored composition 3 |
| Y pixel portion | No | Yellow dye colored composition 1 | No | Yellow pigment colored composition 1 | Yellow dye colored composition 2 |

Examples 1 to 4

An electrode structure was formed on each of first and second substrates, and a vertical alignment-type alignment film was formed on each of the facing surfaces of the substrates and weakly rubbed to form a VA cell. Then, liquid crystal composition 1 having negative dielectric anisotropy and shown in Table 2 was held between the first substrate and the second substrate. Next, liquid crystal display devices of Example 1 were formed by using the color filters 1 to 4 shown in Table 1 ($d_{gap}$=3.5 μm, alignment film SE-5300). VHR and ID of the resultant liquid crystal display devices were measured. Also, image sticking of the resultant liquid crystal display devices was evaluated. The results are shown in Table 3.

TABLE 2

| | Liquid crystal composition 1 |
|---|---|
| 0d1-Cy-Cy-3 | 20 |
| 3-Cy-Cy-2 | 15 |
| 3-Cy-Ph-O1 | 5 |
| 0d1-Cy-1O-Ph5-O1-Cy-2 | 11 |
| 0d1-Cy-1O-Ph5-O1-Cy-3 | 11 |
| 0d1-Cy-1O-Ph5-O1-Cy-4 | 11 |
| 0d1-Cy-1O-Ph5-O1-Cy-5 | 11 |
| 0d1-Cy-Cy-1O-Ph5-O3d0 | 4 |
| 0d1-Cy-Cy-1O-Ph5-O4d0 | 4 |
| 0d1-Cy-1O-Ph5-O1-Cy-Cy-2 | 4 |
| 0d1-Cy-1O-Ph5-O1-Cy-Cy-3 | 4 |
| Composition ratio total (%) | 100 |
| Tni/° C. | 82.4 |
| Δn (20° C.) | 0.074 |
| η20/mPa · s | 16.1 |
| Δε (20° C.) | −4.7 |

TABLE 3

| | Example 1 | Example 2 | Example 3 | Example 4 |
|---|---|---|---|---|
| Liquid crystal composition | Liquid crystal composition 1 | Liquid crystal composition 1 | Liquid crystal compostion 1 | Liquid crystal composition 1 |
| Color filter | Color filter 1 | Color filter 2 | Color filter 3 | Color filter 4 |
| VHR | 99.2 | 99.0 | 99.4 | 99.6 |
| ID | 59 | 79 | 24 | 16 |
| Image sticking | B | B | A | A |

The liquid crystal display devices of Examples 1 to 4 could realize high VHR and small ID. Also, in evaluation of image sticking, no residual image or slight residual image at an allowable level was observed.

Comparative Examples 1 to 8

Each of comparative liquid crystal composition 1 and comparative liquid crystal composition 2 shown in Table 4 and having negative dielectric anisotropy was interposed in the VA cell used in Example 1, liquid crystal display devices of Comparative Examples 1 to 8 were formed by using the color filters 1 to 4 shown in Table 1, and VHR and ID of the resultant liquid crystal display devices were measured. Also, image sticking of the resultant liquid crystal display devices was evaluated. The results are shown in Table 5 and Table 6.

TABLE 4

|  | Comparative liquid crystal composition 1 | Comparative liquid crystal composition 2 |
|---|---|---|
| 0d1-Cy-Cy-3 | 20 | 20 |
| 3-Cy-Cy-2 | 15 | 14 |
| 3-Cy-Ph-O1 | 5 | 5 |
| 0d1-Cy-1O-Ph15-O1-Cy-2 | 8 | 8 |
| 0d1-Cy-1O-Ph15-O1-Cy-3 | 8 | 8 |
| 0d1-Cy-1O-Ph15-O1-Cy-4 | 10 | 10 |
| 0d1-Cy-1O-Ph15-O1-Cy-5 | 10 | 10 |
| 0d1-Cy-Cy-1O-Ph15-O3d0 | 4 | 4 |
| 0d1-Cy-Cy-1O-Ph15-O4d0 | 4 | 4 |
| 0d1-Cy-1O-Ph15-O1-Cy-Cy-2 | 4 | 4 |
| 0d1-Cy-1O-Ph15-O1-Cy-Cy-3 | 4 | 4 |
| 3-Cy-Oc-Ph15-O1 |  | 8 |
| 3-Cy-Cb1-Ph15-O2 | 3 |  |
| 5-Cy-Cb1-Ph15-O2 | 3 |  |
| 5-Cy-Cb-Ph15-O2 | 2 |  |
| Composition ratio total | 100 | 100 |
| Tni/° C. | 81.9 | 81.3 |
| Δn (20° C.) | 0.073 | 0.074 |
| η20/mPa·s | 17.3 | 16.8 |
| Δε (20° C.) | −4.6 | −4.7 |

TABLE 5

|  | Comparative Example 1 | Comparative Example 2 | Comparative Example 3 | Comparative Example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.3 | 98.5 | 98.6 | 98.8 |
| ID | 151 | 146 | 122 | 110 |
| Image sticking | D | D | D | C |

TABLE 6

|  | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.2 | 98.2 | 98.8 | 98.7 |
| ID | 148 | 153 | 108 | 118 |
| Image sticking | D | D | C | D |

The liquid crystal display devices of Comparative Examples 1 to 8 showed lower VHR and larger ID than the liquid crystal display devices of the present invention. Also, in evaluation of image sticking, the occurrence of residual image at an unallowable level was observed.

Comparative Example 9

The liquid crystal composition 1 shown in Table 2 and having negative dielectric anisotropy was interposed in the VA cell used in Example 1, and a liquid crystal display device of Comparative Example 9 was formed by using the comparative color filter 1 shown in Table 1, and VHR and ID of the resultant liquid crystal display device were measured. Also, image sticking of the resultant liquid crystal display device was evaluated. The results are shown in Table 7.

TABLE 7

|  | Comparative Example 9 |
|---|---|
| Liquid crystal composition | Liquid crystal composition 1 |
| Color filter | Comparative color filter 1 |
| VHR | 97.7 |
| ID | 208 |
| Image sticking | D |

The liquid crystal display device of Comparative Example 9 showed lower VHR and larger ID than the liquid crystal display devices of the present invention. Also, in evaluation of image sticking, the occurrence of residual image at an unallowable level was observed.

Comparative Examples 10 to 13

As in Example 1, comparative liquid crystal composition 3 shown in Table 8 and having negative dielectric anisotropy was interposed, and liquid crystal display devices of Comparative Examples 10 to 13 were formed by using the color filters 1 to 4 shown in Table 1, and VHR and ID of the resultant liquid crystal display devices were measured. Also, image sticking of the resultant liquid crystal display devices was evaluated. The results are shown in Table 9.

TABLE 8

|  | Comparative liquid crystal composition 3 |
|---|---|
| 3-Cy-Ph15-O4 | 11 |
| 5-Cy-Ph15-O4 | 11 |
| 2-Cy-Cy-Ph15-1 | 12 |
| 2-Cy-Cy-Ph15-O2 | 9 |
| 3-Cy-Cb1-Ph15-O2 | 4 |
| 3-Cy-Cy-Ph15-1 | 12 |
| 3-Cy-Cy-Ph15-O2 | 9 |
| 5-Cy-Cb1-Ph15-O2 | 6 |
| 5-Cy-Cb-Ph15-O2 | 18 |
| 5-Cy-Cy-Ph15-O2 | 8 |
| Composition ratio total (%) | 100 |
| Tni/° C. | 118.1 |

TABLE 8-continued

|  | Comparative liquid crystal composition 3 |
|---|---|
| Δn (20° C.) | 0.105 |
| ne (20° C.) | 1.586 |
| Δε (20° C.) | −6.4 |
| ε⊥ (20° C.) | 10.4 |
| K3/K1 (20° C.) | 1.05 |
| K1/pN (20° C.) | 20.2 |

TABLE 9

|  | Comparative Example 10 | Comparative Example 11 | Comparative Example 12 | Comparative Example 13 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.1 | 98.4 | 98.8 | 98.5 |
| ID | 143 | 123 | 105 | 119 |
| Image sticking | D | D | C | D |

The liquid crystal display devices of Comparative Examples 10 to 13 showed lower VHR and larger ID than the liquid crystal display devices of the present invention. Also, in evaluation of image sticking, the occurrence of residual image at an unallowable level was observed.

Examples 5 to 12

As in Example 1, each of liquid crystals with negative dielectric anisotropy shown in Table 10 was held, and liquid crystal display devices of Examples 5 to 12 were formed by using the color filters shown in Table 1. VHR and ID of the resultant liquid crystal display devices were measured. Also, image sticking of the resultant liquid crystal display devices was evaluated. The results are shown in Tables 11 and 12.

TABLE 10

|  | Liquid crystal composition 2 | Liquid crystal composition 3 |
|---|---|---|
| 3-Cy-1O-Ph5-O2 | 11 | 11 |
| 5-Cy-1O-Ph5-O2 | 10 | 10 |
| 0d1-Cy-Cy-3 | 20 |  |
| 0d1-Cy-Cy-5 |  | 20 |
| 0d3-Cy-Cy-3 | 10 | 10 |
| 3-Cy-1=1-Cy-3 | 10 | 10 |
| 0d1-Cy-1O-Ph5-O1-Cy-3 |  | 5 |
| 0d1-Cy-Cy-1O-Ph5-O3d0 |  | 5 |
| 0d1-Cy-Cy-1O-Ph5-O4d0 |  | 5 |
| 2-Cy-Cy-1O-Ph5-O2 | 5 | 5 |
| 3-Cy-Cy-1O-Ph5-O2 | 12 | 12 |
| 4-Cy-Cy-1O-Ph5-O2 | 5 | 5 |
| 0d1-Cy-1O-Ph5-O1-Cy-Cy-1d0 | 12 |  |
| 0d1-Cy-1O-Ph5-O1-Cy-Cy-2 | 5 |  |
| 0d1-Cy-1O-Ph5-O1-Cy-Cy-3 |  | 2 |
| Composition ratio total (%) | 100 | 100 |
| Tni/° C. | 79.6 | 78.9 |
| Δn (20° C.) | 0.074 | 0.075 |
| η20/mPa·s | 17.8 | 18.2 |
| Δε (20° C.) | −4.8 | −4.8 |

TABLE 11

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.1 | 99.4 | 99.5 | 99.7 |
| ID | 65 | 42 | 26 | 11 |
| Image sticking | B | A | A | A |

TABLE 12

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.0 | 99.3 | 99.6 | 99.4 |
| ID | 81 | 58 | 15 | 21 |
| Image sticking | B | B | A | A |

The liquid crystal display devices of Examples 5 to 12 could realize high VHR and small ID. Also, in evaluation of image sticking, no residual image or slight residual image at an allowable level was observed.

Examples 13 to 28

As in Example 1, each of liquid crystals with negative dielectric anisotropy shown in Table 13 was held, and liquid crystal display devices of Examples 13 to 28 were formed by using the color filters shown in Table 1. VHR and ID of the resultant liquid crystal display devices were measured. Also, image sticking of the resultant liquid crystal display devices was evaluated. The results are shown in Tables 14 to 17.

TABLE 13

|  | Liquid crystal composition 4 | Liquid crystal composition 5 | Liquid crystal composition 6 | Liquid crystal composition 7 |
|---|---|---|---|---|
| 0d1-Cy-1O-Ph5-O3d0 |  |  |  | 5 |
| 0d1-Cy-1O-Ph5-O4d0 |  |  |  | 5 |
| 0d1-Cy-Cy-3 | 10 |  | 18 | 4 |
| 3-Cy-Cy-2 | 10 | 18 |  | 10 |
| 3-Cy-Cy-4 |  | 6 | 15 | 3 |
| 3-Cy-Ph-O2 | 12 | 12 | 15 | 4 |
| 5-Ph-Ph-1 | 10 | 3 | 3 | 10 |
| 0d1-Cy-1O-Ph5-O1-Cy-2 | 10 | 10 | 10 |  |
| 0d1-Cy-1O-Ph5-O1-Cy-3 | 12 | 12 | 12 |  |
| 0d1-Cy-1O-Ph5-O1-Cy-4 | 12 | 12 | 12 |  |
| 0d1-Cy-1O-Ph5-O1-Cy-5 | 10 | 10 | 10 |  |
| 0d1-Cy-1O-Ph5-O1d0 |  |  |  | 10 |
| 0d1-Cy-Cy-1O-Ph5-O2d0 |  |  |  | 10 |

TABLE 13-continued

|  | Liquid crystal composition 4 | Liquid crystal composition 5 | Liquid crystal composition 6 | Liquid crystal composition 7 |
|---|---|---|---|---|
| 0d1-Cy-Cy-1O-Ph5-O3d0 |  |  |  | 15 |
| 0d1-Cy-Cy-1O-Ph5-O4d0 |  |  |  | 15 |
| 3-Cy-Cy-Ph-1 | 6 | 3 |  | 6 |
| 0d1-Cy-1O-Ph5-O1-Cy-Cy-2 | 4 | 4 | 4 |  |
| 0d1-Cy-1O-Ph5-O1-Cy-Cy-3 | 4 | 4 | 4 |  |
| Composition ratio total (%) | 100 | 100 | 100 | 100 |
| Tni/° C. | 75.5 | 81.8 | 83.5 | 75.1 |
| Δn (20° C.) | 0.088 | 0.077 | 0.078 | 0.087 |
| η20/mPa · s | 16 | 16.5 | 20.2 | 15.5 |
| Δε (20° C.) | −4.2 | −4.2 | −4.2 | −4.3 |

TABLE 14

|  | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.2 | 99.1 | 99.4 | 99.6 |
| ID | 49 | 61 | 27 | 15 |
| Image sticking | A | B | A | A |

TABLE 15

|  | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.0 | 99.2 | 99.6 | 99.6 |
| ID | 64 | 47 | 17 | 18 |
| Image sticking | B | A | A | A |

TABLE 16

|  | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.1 | 99.0 | 99.5 | 99.3 |
| ID | 75 | 83 | 27 | 31 |
| Image sticking | A | B | A | A |

TABLE 17

|  | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.3 | 99.2 | 99.7 | 99.5 |
| ID | 53 | 61 | 19 | 36 |
| Image sticking | A | A | A | A |

The liquid crystal display devices of Examples 13 to 28 could realize high VHR and small ID. Also, in evaluation of image sticking, no residual image or slight residual image at an allowable level was observed.

Examples 29 to 40

As in Example 1, each of liquid crystals with negative dielectric anisotropy shown in Table 18 was held, and liquid crystal display devices of Examples 29 to 40 were formed by using the color filters shown in Table 1. VHR and ID of the resultant liquid crystal display devices were measured. Also, image sticking of the resultant liquid crystal display devices was evaluated. The results are shown in Tables 19 to 21.

TABLE 18

|  | Liquid crystal composition 8 | Liquid crystal composition 9 | Liquid crystal composition 10 |
|---|---|---|---|
| 2-Cy-2-Nd4-O2 |  | 4 | 4 |
| 2-Cy-2-Nd4-O4 |  | 4 | 4 |
| 3-Cy-1O-Ch3-5 | 3 |  |  |
| 3-Cy-1O-Nd4-O4 | 3 | 4 | 4 |
| 5-Cy-1O-Ch3-5 | 3 |  |  |
| 5-Cy-1O-Nd4-O2 | 2 |  |  |
| 5-Cy-1O-Nd4-O3 | 3 | 4 | 4 |
| 0d1-Cy-Cy-5 |  | 23 |  |
| 0d3-Cy-Cy-3 |  | 10 |  |
| 1d1-Cy-Cy-3 |  | 8 |  |
| 3-Cy-Cy-2 | 15 |  |  |
| 3-Cy-Cy-4 | 7 | 6 | 22 |
| 3-Cy-Cy-5 | 7 |  | 22 |
| 3-Cy-Ph-2 |  | 15 | 15 |
| 3-Cy-Ph-O1 | 5 |  |  |
| 3-Cy-Ph-O2 | 5 |  |  |
| 5-Ph-Ph-1 | 6 |  |  |
| 2-Cy-Cy-1O-Nd4-O2 | 3 | 4 | 4 |
| 2-Cy-Cy-1O-Nd4-O4 | 2 | 4 | 4 |
| 3-Cy-2-Cy-1O-Nd4-O2 | 4 |  |  |
| 3-Cy-2-Cy-1O-Nd4-O3 | 4 |  |  |
| 3-Cy-Cy-1O-Ch3-5 | 3 |  |  |
| 3-Cy-Cy-1O-Nd4-O4 | 3 | 4 | 4 |
| 4-Cy-Cy-1O-Ch3-5 | 3 |  |  |
| 4-Cy-Cy-1O-Nd4-O2 | 2 | 4 | 4 |
| 4-Cy-Cy-2-Nd4-O2 |  | 6 | 6 |
| 3-Cy-Cy-Ph-1 | 8 |  | 3 |
| Composition ratio total (%) | 100 | 100 | 100 |
| Tni/° C. | 92 | 90 | 91 |
| Δn (20° C.) | 0.093 | 0.092 | 0.093 |
| η20/mPa · s | 24.9 | 24.1 | 25.5 |
| Δε (20° C.) | −3.3 | −3.2 | −3.2 |

TABLE 19

|  | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.2 | 99.2 | 99.6 | 99.5 |
| ID | 93 | 97 | 23 | 18 |
| Image sticking | B | B | A | A |

TABLE 20

|  | Example 33 | Example 34 | Example 35 | Example 36 |
| --- | --- | --- | --- | --- |
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.1 | 99.1 | 99.7 | 99.4 |
| ID | 105 | 112 | 16 | 24 |
| Image sticking | B | B | A | A |

TABLE 21

|  | Example 37 | Example 38 | Example 39 | Example 40 |
| --- | --- | --- | --- | --- |
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 98.9 | 99.3 | 99.6 | 99.3 |
| ID | 138 | 76 | 19 | 31 |
| Image sticking | B | B | A | A |

The liquid crystal display devices of Examples 29 to 40 could realize high VHR and small ID. Also, in evaluation of image sticking, no residual image or slight residual image at an allowable level was observed.

Examples 41 to 48

As in Example 1, each of liquid crystals with negative dielectric anisotropy shown in Table 22 was held, and liquid crystal display devices of Examples 41 to 48 were formed by using the color filters shown in Table 1. VHR and ID of the resultant liquid crystal display devices were measured. Also, image sticking of the resultant liquid crystal display devices was evaluated. The results are shown in Tables 23 and 24.

TABLE 22

|  | Liquid crystal composition 11 | Liquid crystal composition 12 |
| --- | --- | --- |
| 3-Cy-1O-Ch3-5 | 2 |  |
| 3-Cy-2-Ph5-O2 | 6 | 10 |
| 3-Cy-Ph5-O2 |  | 10 |
| 4-Cy-1O-Nd4-O2 | 5 | 5 |
| 5-Cy-1O-Ch3-5 | 2 |  |
| 0d1-Cy-Cy-5 |  | 16 |
| 3-Cy-1=1-Cy-3 |  | 10 |
| 3-Cy-Cy-2 | 15 |  |
| 3-Cy-Cy-4 | 7 |  |
| 3-Cy-Cy-5 | 7 |  |
| 3-Cy-Ph-O1 | 6 |  |
| 3-Cy-2-Cy-1O-Nd4-O2 | 3 |  |
| 3-Cy-2-Cy-1O-Nd4-O3 | 3 |  |
| 3-Cy-Cy-1O-Ch3-5 | 2 |  |
| 3-Cy-Cy-2-Ph5-O2 | 7 | 10 |
| 3-Cy-Cy-Ph5-1 | 7 | 10 |
| 3-Cy-Cy-Ph5-O2 | 7 | 10 |
| 4-Cy-Cy-1O-Ch3-5 | 2 |  |
| 5-Cy-Cy-1O-Nd4-O3 | 5 | 5 |
| 0d1-Cy-Cy-Ph-1 |  | 14 |
| 3-Cy-Cy-Ph-1 | 14 |  |
| Composition ratio total | 100 | 100 |
| Tni/° C. | 87 | 85 |
| Δn (20° C.) | 0.086 | 0.085 |
| η20/mPa · s | 24.2 | 23.8 |
| Δε (20° C.) | −2.7 | −2.5 |

TABLE 23

|  | Example 41 | Example 42 | Example 43 | Example 44 |
| --- | --- | --- | --- | --- |
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.2 | 99.3 | 99.8 | 99.5 |
| ID | 89 | 76 | 11 | 22 |
| Image sticking | B | A | A | A |

TABLE 24

|  | Example 45 | Example 46 | Example 47 | Example 48 |
| --- | --- | --- | --- | --- |
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.3 | 99.2 | 99.7 | 99.7 |
| ID | 98 | 106 | 19 | 17 |
| Image sticking | B | B | A | A |

The liquid crystal display devices of Examples 41 to 48 could realize high VHR and small ID. Also, in evaluation of image sticking, no residual image or slight residual image at an allowable level was observed.

Examples 49 to 60

As in Example 1, each of liquid crystals with negative dielectric anisotropy shown in Table 25 was held, and liquid crystal display devices of Examples 49 to 60 were formed by using the color filters shown in Table 1. VHR and ID of the resultant liquid crystal display devices were measured. Also, image sticking of the resultant liquid crystal display devices was evaluated. The results are shown in Tables 26 to 28.

TABLE 25

|  | Liquid crystal composition 13 | Liquid crystal composition 14 | Liquid crystal composition 15 |
| --- | --- | --- | --- |
| 3-Cy-1O-Ch3-5 | 3 |  |  |
| 3-Cy-1O-Nd4-O4 | 3 |  | 4 |
| 5-Cy-1O-Ch3-5 | 3 |  |  |
| 5-Cy-1O-Nd4-O2 | 2 | 4 | 4 |
| 5-Cy-1O-Nd4-O3 | 3 | 4 | 4 |
| 3-Cy-Cy-2 | 7 | 21 | 11 |
| 3-Cy-Cy-4 | 11 | 7 | 7 |
| 3-Cy-Cy-5 | 11 | 7 | 7 |
| 3-Cy-Ph-2 |  |  | 6 |
| 3-Cy-Ph-O1 | 7 | 13 | 7 |
| 3-Cy-Ph-O2 | 7 | 13 | 7 |
| 5-Ph-Ph-1 | 6 |  | 13 |
| 2-Cy-Cy-1O-Nd4-O2 | 3 | 4 | 4 |
| 2-Cy-Cy-1O-Nd4-O4 | 2 |  |  |
| 3-Cy-2-Cy-1O-Nd4-O2 | 3 | 4 | 4 |
| 3-Cy-2-Cy-1O-Nd4-O3 | 3 | 4 | 4 |
| 3-Cy-Cy-1O-Ch3-5 | 2 | 3 |  |
| 3-Cy-Cy-1O-Nd4-O4 | 3 | 4 | 4 |
| 4-Cy-Cy-1O-Ch3-5 | 2 | 3 |  |
| 4-Cy-Cy-1O-Nd4-O2 | 2 |  |  |
| 3-Cy-Cy-Ph-1 | 8 | 9 | 6 |
| 3-Cy-Ph-Ph-1 | 9 |  | 6 |
| Composition ratio total (%) | 100 | 100 | 98 |
| Tni/° C. | 86 | 81 | 76 |

TABLE 25-continued

|  | Liquid crystal composition 13 | Liquid crystal composition 14 | Liquid crystal composition 15 |
|---|---|---|---|
| Δn (20° C.) | 0.091 | 0.082 | 0.104 |
| η20/mPa·s | 20 | 19.2 | 17.8 |
| Δε (20° C.) | −2.7 | −2.5 | −2.3 |

TABLE 26

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 98.9 | 99.1 | 99.5 | 99.7 |
| ID | 154 | 102 | 37 | 15 |
| Image sticking | B | A | A | A |

TABLE 27

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |

TABLE 27-continued

|  | Example 53 | Example 54 | Example 55 | Example 56 |
|---|---|---|---|---|
| Color filter | Color filter 1 | Color filter 2 | Color filter 3 | Color filter 4 |
| VHR | 99.2 | 99.1 | 99.7 | 99.5 |
| ID | 88 | 106 | 16 | 24 |
| Image sticking | A | B | A | A |

TABLE 28

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.1 | 99.2 | 99.6 | 99.5 |
| ID | 104 | 68 | 26 | 27 |
| Image sticking | B | B | A | A |

The liquid crystal display devices of Examples 49 to 60 could realize high VHR and small ID. Also, in evaluation of image sticking, no residual image or slight residual image at an allowable level was observed.

Examples 61 to 76

As in Example 1, each of liquid crystals with negative dielectric anisotropy shown in Table 29 was held, and liquid crystal display devices of Examples 61 to 76 were formed by using the color filters shown in Table 1. VHR and ID of the resultant liquid crystal display devices were measured. Also, image sticking of the resultant liquid crystal display devices was evaluated. The results are shown in Tables 30 to 33.

TABLE 29

|  | Liquid crystal composition 16 | Liquid crystal composition 17 | Liquid crystal composition 18 | Liquid crystal composition 19 |
|---|---|---|---|---|
| 3-Cy-1O-Ph5-O2 |  | 2 |  | 11 |
| 5-Cy-1O-Ph5-O2 |  | 2 |  | 10 |
| 0d1-Cy-Cy-3 |  |  | 30 |  |
| 0d1-Cy-Cy-5 | 4 | 4 | 10 | 20 |
| 0d3-Cy-Cy-3 |  |  |  | 10 |
| 3-Cy-1=1-Cy-3 |  |  |  | 10 |
| 3-Cy-Cy-2 | 4 | 4 |  |  |
| 3-Cy-Cy-4 | 4 | 4 |  |  |
| 3-Cy-Cy-5 | 4 | 4 |  |  |
| 3-Cy-Ph-O1 | 2 | 2 |  |  |
| 5-Ph-Ph-1 | 20 | 20 |  |  |
| 0d1-Cy-1O-Ph5-O1-Cy-1d0 |  |  |  | 12 |
| 0d1-Cy-1O-Ph5-O1-Cy-2 | 7 | 8 | 10 |  |
| 0d1-Cy-1O-Ph5-O1-Cy-3 | 7 | 8 | 12 |  |
| 0d1-Cy-1O-Ph5-O1-Cy-4 | 7 | 8 | 12 |  |
| 0d1-Cy-1O-Ph5-O1-Cy-5 | 5 |  | 10 |  |
| 0d1-Cy-Cy-1O-Ph5-O3d0 | 13 |  | 6 |  |
| 0d1-Cy-Cy-1O-Ph5-O4d0 | 13 |  | 6 |  |
| 2-Cy-Cy-1O-Ph5-O2 |  | 13 |  | 5 |
| 3-Cy-Cy-1O-Ph5-O2 |  | 13 |  | 12 |
| 4-Cy-Cy-1O-Ph5-O2 |  | 13 |  | 5 |

TABLE 29-continued

|  | Liquid crystal composition 16 | Liquid crystal composition 17 | Liquid crystal composition 18 | Liquid crystal composition 19 |
|---|---|---|---|---|
| 0d1-Cy-1O-Ph5-O1-Cy-Cy-2 | 5 |  | 2 | 5 |
| 0d1-Cy-1O-Ph5-O1-Cy-Cy-3 | 5 | 5 | 2 |  |
| Composition ratio total (%) | 100 | 110 | 100 | 100 |
| Tni/° C. | 80.5 | 79.8 | 83.6 | 83.1 |
| Δn (20° C.) | 0.102 | 0.101 | 0.075 | 0.075 |
| η20/mPa · s | 23.9 | 27.6 | 15.1 | 18 |
| Δε (20° C.) | −4.1 | −4.1 | −4.8 | −4.8 |

TABLE 30

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.0 | 99.1 | 99.6 | 99.6 |
| ID | 93 | 85 | 25 | 24 |
| Image sticking | B | B | A | A |

TABLE 31

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.1 | 99.1 | 99.5 | 99.7 |
| ID | 81 | 84 | 21 | 17 |
| Image sticking | A | B | A | A |

TABLE 32

|  | Example 69 | Example 70 | Example 71 | Example 72 |
|---|---|---|---|---|
| Liquid crystal composition | Liquid crystal composition 18 | Liquid crystal composition 18 | Liquid crystal composition 18 | Liquid crystal composition 18 |

TABLE 32-continued

|  | Example 69 | Example 70 | Example 71 | Example 72 |
|---|---|---|---|---|
| Color filter | Color filter 1 | Color filter 2 | Color filter 3 | Color filter 4 |
| VHR | 99.2 | 99.2 | 99.7 | 99.4 |
| ID | 86 | 88 | 15 | 29 |
| Image sticking | A | B | A | A |

TABLE 33

|  | Example 73 | Example 74 | Example 75 | Example 76 |
|---|---|---|---|---|
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.1 | 99.0 | 99.5 | 99.5 |
| ID | 97 | 101 | 27 | 28 |
| Image sticking | B | B | A | A |

The liquid crystal display devices of Examples 61 to 76 could realize high VHR and small ID. Also, in evaluation of image sticking, no residual image or slight residual image at an allowable level was observed.

Examples 77 to 92

As in Example 1, each of liquid crystals with negative dielectric anisotropy shown in Table 34 was held, and liquid crystal display devices of Examples 77 to 92 were formed by using the color filters shown in Table 1. VHR and ID of the resultant liquid crystal display devices were measured. Also, image sticking of the resultant liquid crystal display devices was evaluated. The results are shown in Tables 35 to 38.

TABLE 34

|  | Liquid crystal composition 20 | Liquid crystal composition 21 | Liquid crystal composition 22 | Liquid crystal composition 23 |
|---|---|---|---|---|
| 2-Cy-2-Nd4-O2 |  | 10 |  | 10 |
| 3-Cy-1O-Ch3-O5 | 7 |  | 10 |  |
| 3-Cy-2-Nd4-O4 |  | 10 |  | 10 |
| 4-Cy-2-Nd4-O2 |  | 10 |  | 10 |

TABLE 34-continued

|  | Liquid crystal composition 20 | Liquid crystal composition 21 | Liquid crystal composition 22 | Liquid crystal composition 23 |
|---|---|---|---|---|
| 5-Cy-1O-Ch3-O5 | 7 |  | 10 |  |
| 5-Cy-2-Nd4-O2 |  | 5 |  | 5 |
| 0d1-Cy-Cy-3 | 30 | 40 |  |  |
| 0d1-Cy-Cy-5 |  |  | 15 | 20 |
| 3-Cy-Cy-4 |  |  | 15 | 14 |
| 3-Cy-Ph-O2 |  |  |  | 10 |
| 5-Ph-Ph-1 | 10 |  | 10 |  |
| 2-Cy-Cy-2-Nd4-O2 |  | 4 |  | 4 |
| 3-Cy-Cy-1O-Ph5-O1 | 4 |  | 3 |  |
| 3-Cy-Cy-1O-Ph5-O2 | 9 |  | 5 |  |
| 3-Cy-Cy-2-Ph5-O2 | 10 |  | 10 |  |
| 3-Cy-Cy-Ph5-O2 | 10 |  | 10 |  |
| 4-Cy-Cy-1O-Ph5-O1 | 4 |  | 3 |  |
| 4-Cy-Cy-2-Nd4-O2 |  | 4 |  | 4 |
| 0d1-Cy-Cy-Ph-1 | 9 | 6 | 9 | 4 |
| 0d1-Cy-Ph-Ph-3 |  | 5 |  | 3 |
| 0d3-Cy-Cy-Ph-1 |  | 6 |  | 6 |
| Composition ratio total (%) | 100 | 100 | 100 | 100 |
| Tni/° C. | 82.7 | 82.3 | 80.9 | 81.8 |
| Δn (20° C.) | 0.087 | 0.098 | 0.084 | 0.097 |
| η20/mPa·s | 19.4 | 18.1 | 26 | 22.7 |
| Δε (20° C.) | −3.1 | −3.1 | −3.1 | −3.2 |

TABLE 35

|  | Example 77 | Example 78 | Example 79 | Example 80 |
|---|---|---|---|---|
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.1 | 99.1 | 99.6 | 99.6 |
| ID | 79 | 78 | 19 | 23 |
| Image sticking | B | B | A | A |

TABLE 36

|  | Example 81 | Example 82 | Example 83 | Example 84 |
|---|---|---|---|---|
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 99.2 | 99.0 | 99.5 | 99.4 |
| ID | 89 | 96 | 29 | 61 |
| Image sticking | A | B | A | A |

TABLE 37

|  | Example 85 | Example 86 | Example 87 | Example 88 |
|---|---|---|---|---|
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.2 | 99.2 | 99.7 | 99.6 |
| ID | 77 | 81 | 12 | 19 |
| Image sticking | B | B | A | A |

TABLE 38

|  | Example 89 | Example 90 | Example 91 | Example 92 |
|---|---|---|---|---|
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 98.9 | 99.1 | 99.4 | 99.2 |
| ID | 137 | 94 | 41 | 78 |
| Image sticking | B | B | A | A |

The liquid crystal display devices of Examples 77 to 92 could realize high VHR and small ID. Also, in evaluation of image sticking, no residual image or slight residual image at an allowable level was observed.

Examples 93 to 100

As in Example 1, each of liquid crystals with negative dielectric anisotropy shown in Table 39 was held, and liquid crystal display devices of Examples 93 to 100 were formed by using the color filters shown in Table 1. VHR and ID of the resultant liquid crystal display devices were measured. Also, image sticking of the resultant liquid crystal display devices was evaluated. The results are shown in Tables 40 and 41.

TABLE 39

|  | Liquid crystal composition 24 | Liquid crystal composition 25 |
|---|---|---|
| 3-Cy-Ph5-O4 | 9 | 10 |
| 3O-Ph5-Ph5-O2 | 8 |  |
| 5-Cy-Ph5-O4 | 9 | 10 |
| 0d1-Cy-Cy-5 | 5 |  |
| 0d1-O-Cy-Cy-Ph5-1 |  | 10 |
| 0d2-Cy-Cy-Ph5-O2 | 10 |  |
| 0d2-O-Cy-Cy-Ph5-1 |  | 10 |
| 1d2-O-Cy-Cy-Ph5-1 |  | 8 |
| 2-Cy-Cy-Ph5-1 | 11 | 12 |
| 2-Cy-Cy-Ph5-O2 | 9 | 10 |
| 3-Cy-Cy-Ph5-1 | 10 | 11 |
| 3-Cy-Cy-Ph5-O2 | 10 | 10 |
| 3-O-Cy-Cy-Ph5-O2 | 10 |  |

TABLE 39-continued

|  | Liquid crystal composition 24 | Liquid crystal composition 25 |
|---|---|---|
| 5-Cy-Cy-Ph5-O2 | 9 | 9 |
| Composition ratio total (%) | 100 | 100 |
| Tni/° C. | 101.2 | 103.9 |
| Δn (20° C.) | 0.100 | 0.098 |
| ne (20° C.) | 1.581 | 1.579 |
| Δε (20° C.) | −7.5 | −5.5 |
| ε⊥ (20° C.) | 11.9 | 9.5 |
| K3/K1 (20° C.) | 1.08 | 1.16 |
| K1/pN (20° C.) | 15.8 | 16.5 |

TABLE 40

|  | Example 93 | Example 94 | Example 95 | Example 96 |
|---|---|---|---|---|
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.2 | 99.2 | 99.8 | 99.6 |
| ID | 67 | 69 | 12 | 26 |
| Image sticking | A | B | A | A |

TABLE 41

|  | Example 97 | Example 98 | Example 99 | Example 100 |
|---|---|---|---|---|
| Liquid crystal composition | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 |
| VHR | 99.3 | 99.2 | 99.6 | 99.5 |
| ID | 59 | 68 | 31 | 39 |
| Image sticking | A | A | A | A |

The liquid crystal display devices of Examples 93 to 100 could realize high VHR and small ID. Also, in evaluation of image sticking, no residual image or slight residual image at an allowable level was observed.

Examples 101 to 112

As in Example 1, each of liquid crystals with negative dielectric anisotropy shown in Table 42 was held, and liquid crystal display devices of Examples 101 to 112 were formed by using the color filters shown in Table 1. VHR and ID of the resultant liquid crystal display devices were measured. Also, image sticking of the resultant liquid crystal display devices was evaluated. The results are shown in Tables 43 to 45.

TABLE 42

|  | Liquid crystal composition 26 | Liquid crystal composition 27 | Liquid crystal composition 28 |
|---|---|---|---|
| 3-Cy-Ph5-O4 | 16 | 16 | 16 |
| 5-Cy-Ph5-O2 | 12 | 16 | 16 |
| 0d1-Cy-Cy-5 | 7 | 4 | 10 |
| 0d3-Ph-Ph-1 | 11 | 10 | 10 |
| 1d1-Cy-Cy-3 | 9 | 8 |  |
| 2-Cy-Ph-Ph5-O2 | 13 | 12 | 12 |
| 3-Cy-Cy-Ph5-O2 | 6 | 7 | 10 |
| 3-Cy-Ph-Ph5-O2 | 12 | 12 | 12 |
| 0d1-Cy-Cy-Ph-1 | 4 | 4 | 4 |
| 3-Cy-Ph-Ph-2 | 10 | 11 | 10 |
| Composition ratio total (%) | 100 | 100 | 100 |
| Tni/° C. | 80.2 | 80.3 | 80.9 |
| Δn (20° C.) | 0.128 | 0.129 | 0.126 |
| ne (20° C.) | 1.492 | 1.491 | 1.491 |
| Δε (20° C.) | −3.3 | −3.5 | −3.7 |
| ε⊥ (20° C.) | 6.8 | 7.1 | 7.4 |
| K3/K1 (20° C.) | 0.99 | 1.01 | 1.04 |
| K1/pN (20° C.) | 16.7 | 15.2 | 16.4 |

TABLE 43

|  | Example 101 | Example 102 | Example 103 | Example 104 |
|---|---|---|---|---|
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.2 | 99.2 | 99.7 | 99.5 |
| ID | 67 | 71 | 22 | 38 |
| Image sticking | B | A | A | A |

TABLE 44

|  | Example 105 | Example 106 | Example 107 | Example 108 |
|---|---|---|---|---|
| Liquid crystal composition | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 |
| VHR | 99.1 | 99.1 | 99.5 | 99.5 |
| ID | 79 | 81 | 32 | 32 |
| Image sticking | A | A | A | A |

TABLE 45

|  | Example 109 | Example 110 | Example 111 | Example 112 |
|---|---|---|---|---|
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 99.4 | 99.2 | 99.6 | 99.5 |
| ID | 28 | 83 | 26 | 34 |
| Image sticking | A | A | A | A |

The liquid crystal display devices of Examples 101 to 112 could realize high VHR and small ID. Also, in evaluation of image sticking, no residual image or slight residual image at an allowable level was observed.

Examples 113 to 124

As in Example 1, each of liquid crystals with negative dielectric anisotropy shown in Table 46 was held, and liquid crystal display devices of Examples 101 to 112 were formed by using the color filters shown in Table 1. VHR and ID of the resultant liquid crystal display devices were measured. Also, image sticking of the resultant liquid crystal display devices was evaluated. The results are shown in Tables 47 to 49.

TABLE 46

|  | Liquid crystal composition 29 | Liquid crystal composition 30 | Liquid crystal composition 31 |
|---|---|---|---|
| 3-Cy-Ph5-O4 | 16 | 16 | 16 |
| 5-Cy-Ph5-O2 | 12 | 16 | 16 |
| 0d1-Cy-Cy-5 | 12 | 10 | 20 |
| 0d3-Ph-Ph-1 | 6 | 4 |  |
| 1d1-Cy-Cy-3 | 9 | 8 |  |
| 2-Ph-Ph5-Ph-2 | 13 | 12 | 12 |
| 3-Cy-Cy-Ph5-O2 | 6 | 7 | 10 |
| 3-Cy-Ph-Ph5-O2 | 12 | 12 | 12 |
| 0d1-Cy-Cy-Ph-1 | 4 | 4 | 4 |
| 3-Cy-Ph-Ph-2 | 10 | 11 | 10 |
| Composition ratio total (%) | 100 | 100 | 100 |
| Tni/° C. | 81.7 | 81.2 | 80.9 |
| Δn (20° C.) | 0.127 | 0.130 | 0.131 |
| ne (20° C.) | 1.494 | 1.495 | 1.498 |
| Δε (20° C.) | −3.0 | −3.3 | −3.6 |
| ε⊥ (20° C.) | 6.9 | 7.2 | 7.5 |
| K3/K1 (20° C.) | 1.02 | 1.03 | 1.06 |
| K1/pN (20° C.) | 15.8 | 15.6 | 16.2 |

TABLE 47

|  | Example 113 | Example 114 | Example 115 | Example 116 |
|---|---|---|---|---|
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.2 | 99.2 | 99.6 | 99.3 |
| ID | 75 | 79 | 22 | 65 |
| Image sticking | A | A | A | A |

TABLE 48

|  | Example 117 | Example 118 | Example 119 | Example 120 |
|---|---|---|---|---|
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 99.3 | 99.2 | 99.6 | 99.6 |
| ID | 49 | 78 | 28 | 25 |
| Image sticking | A | A | A | A |

TABLE 49

|  | 121 | 122 | 123 | 124 |
|---|---|---|---|---|
| Liquid crystal composition | Liquid crystal composition 31 | Liquid crystal composition 31 | Liquid crystal composition 31 | Liquid crystal composition 31 |
| Color filter | Color filter 1 | Color filter 2 | Color filter 3 | Color filter 4 |
| VHR | 99.3 | 99.2 | 99.6 | 99.4 |
| ID | 52 | 78 | 19 | 33 |
| Image sticking | A | B | A | A |

The liquid crystal display devices of Examples 113 to 124 could realize high VHR and small ID. Also, in evaluation of image sticking, no residual image or slight residual image at an allowable level was observed.

Examples 125 to 128

As in Example 1, a liquid crystal with negative dielectric anisotropy shown in Table 50 was held, and liquid crystal display devices of Examples 125 to 128 were formed by using the color filters shown in Table 1. VHR and ID of the resultant liquid crystal display devices were measured. Also, image sticking of the resultant liquid crystal display devices was evaluated. The results are shown in Table 51.

TABLE 50

|  | Liquid crystal composition 32 |
|---|---|
| 0d1-Cy-Cy-5 | 20 |
| 3-Cy-2-Ph5-O2 | 20 |
| 0d1-Cy-Cy-Ph-1 | 5 |
| 5-Cy-2-Ph5-O2 | 20 |
| 3-Cy-Cy-2-Ph5-O2 | 3 |
| 5-Cy-Cy-Ph5-O2 | 3 |
| 3-Cy-Ph-Ph5-O2 | 5 |
| 3-Ph-Ph-Ph-2 | 7 |
| 4-Ph-Ph-Ph-2 | 7 |
| 3-Cy-Cy-VO-Ph-Cy-3 | 4 |
| 3-Cy-Cy-VO-Ph-Cy-4 | 3 |
| 3-Cy-Cy-VO-Ph-Cy-5 | 3 |
| Composition ratio total (%) | 100 |
| Tni/° C. | 81.6 |
| Δn (20° C.) | 0.127 |
| ne (20° C.) | 1.495 |
| Δε (20° C.) | −3.0 |

TABLE 51

|  | Example 125 | Example 126 | Example 127 | Example 128 |
|---|---|---|---|---|
| Liquid crystal composition | Liquid crystal composition 32 | Liquid crystal composition 32 | Liquid crystal composition 32 | Liquid crystal composition 32 |
| Color filter | Color filter 1 | Color filter 2 | Color filter 3 | Color filter 4 |
| VHR | 99.3 | 99.2 | 99.6 | 99.5 |
| ID | 47 | 66 | 19 | 29 |
| Image sticking | A | A | A | A |

The liquid crystal display devices of Examples 125 to 128 could realize high VHR and small ID. Also, in evaluation of image sticking, no residual image or slight residual image at an allowable level was observed.

Examples 129 to 132

A liquid crystal composition 33 was prepared by mixing 0.3% by mass of 2-methyl-acrylic acid 4'-{2-[4-(2-acryloyloxy-ethyl)-phenoxycarbonyl]-ethyl}-biphenyl-4-yl ester with the liquid crystal composition 1 having negative dielectric anisotropy and used in Example 1. The liquid crystal composition 33 was interposed in a VA cell used in Example 1 and then polymerized by ultraviolet irradiation (3.0 J/cm$^2$) for 600 seconds while a driving voltage was applied between electrodes. Next, liquid crystal display devices of Examples 129 to 132 were formed by using the color filters 1 to 4 shown in Table 1, and VHR and ID of the resultant liquid crystal display devices were measured. Also, image sticking of the resultant liquid crystal display devices was evaluated. The results are shown in Table 52.

TABLE 52

|  | Example 129 | Example 130 | Example 131 | Example 132 |
|---|---|---|---|---|
| Liquid crystal composition | Liquid crystal composition 33 | Liquid crystal composition 33 | Liquid crystal composition 33 | Liquid crystal composition 33 |
| Color filter | Color filter 1 | Color filter 2 | Color filter 3 | Color filter 4 |
| VHR | 99.2 | 98.9 | 99.4 | 99.4 |
| ID | 51 | 102 | 29 | 34 |
| Image sticking | B | B | A | A |

The liquid crystal display devices of Examples 125 to 128 could realize high VHR and small ID. Also, in evaluation of image sticking, no residual image or slight residual image at an allowable level was observed.

Examples 132 to 135

A liquid crystal composition 34 was prepared by mixing 0.3% by mass of biphenyl-4,4'-diyl bismethacrylate with the liquid crystal composition 29 having negative dielectric anisotropy. The liquid crystal composition 34 was interposed in a VA cell used in Example 1 and then polymerized by ultraviolet irradiation (3.0 J/cm$^2$) for 600 seconds while a driving voltage was applied between electrodes. Next, liquid crystal display devices of Examples 133 to 136 were formed by using the color filters 1 to 4 shown in Table 1, and VHR and ID of the resultant liquid crystal display devices were measured. Also, image sticking of the resultant liquid crystal display devices was evaluated. The results are shown in Table 53.

TABLE 53

|  | Example 133 | Example 134 | Example 135 | Example 136 |
|---|---|---|---|---|
| Liquid crystal composition | Liquid crystal composition 34 | Liquid crystal composition 34 | Liquid crystal composition 34 | Liquid crystal composition 34 |
| Color filter | Color filter 1 | Color filter 2 | Color filter 3 | Color filter 4 |
| VHR | 99.2 | 99.2 | 99.6 | 99.5 |
| ID | 81 | 88 | 31 | 36 |
| Image sticking | A | A | A | A |

The liquid crystal display devices of Examples 133 to 136 could realize high VHR and small ID. Also, in evaluation of image sticking, no residual image or slight residual image at an allowable level was observed.

Examples 137 to 140

A liquid crystal composition 35 was prepared by mixing 0.3% by mass of 3-fluorobiphenyl-4,4'-diyl bismethacrylate with the liquid crystal composition 32 having negative dielectric anisotropy. The liquid crystal composition 35 was interposed in a VA cell used in Example 1 and then polymerized by ultraviolet irradiation (3.0 J/cm$^2$) for 600 seconds while a driving voltage was applied between electrodes. Next, liquid crystal display devices of Examples 137 to 140 were formed by using the color filters 1 to 4 shown in Table 1, and VHR and ID of the resultant liquid crystal display devices were measured. Also, image sticking of the resultant liquid crystal display devices was evaluated. The results are shown in Table 54.

TABLE 54

|  | Example 137 | Example 138 | Example 139 | Example 140 |
|---|---|---|---|---|
| Liquid crystal composition | Liquid crystal composition 35 | Liquid crystal composition 35 | Liquid crystal composition 35 | Liquid crystal composition 35 |
| Color filter | Color filter 1 | Color filter 2 | Color filter 3 | Color filter 4 |
| VHR | 99.1 | 99.0 | 99.6 | 99.6 |
| ID | 68 | 87 | 28 | 31 |
| Image sticking | B | B | A | A |

The liquid crystal display devices of Examples 137 to 140 could realize high VHR and small ID. Also, in evaluation of image sticking, no residual image or slight residual image at an allowable level was observed.

The invention claimed is:

1. A liquid crystal display device comprising a first substrate, a second substrate, a liquid crystal composition layer held between the first substrate and the second substrate, a color filter including a black matrix and at least RGB three-color pixel portions, a pixel electrode, and a common electrode, wherein the liquid crystal composition layer includes a liquid crystal composition which contains at least one compound selected from a compound group represented by general formula (LC1) to general formula (LC4),

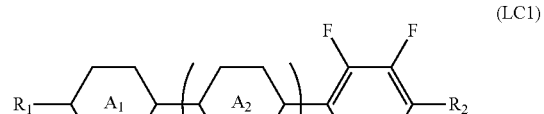

(LC1)

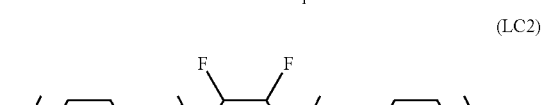

(LC2)

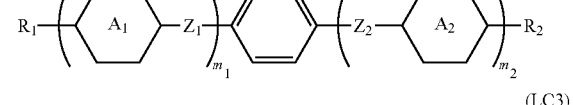

(LC3)

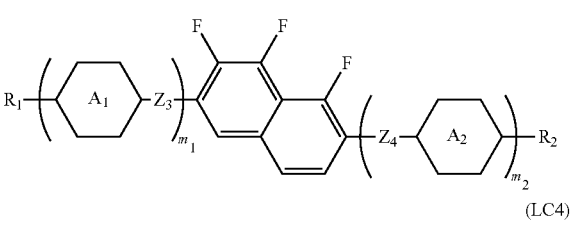

(LC4)

(in the formulae, $R_1$ and $R_2$ each independently represent an alkyl group having 1 to 15 carbon atoms, at least one $CH_2$ group in the alkyl group may be substituted by —O—, —CH=CH—, —CO—, —OCO—, —COO—, —C≡C—, —CF$_2$O—, or —OCF$_2$— so that oxygen atoms are not directly adjacent to each other, at least one hydrogen atom in the alkyl group may be arbitrarily substituted by a halogen, $A_1$ and $A_2$ each independently represent any one of the following structures,

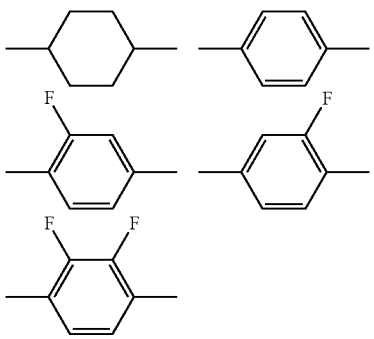

(at least one $CH_2$ group in a cyclohexane ring in the structures may be substituted by an oxygen atom, at least one CH group in a benzene ring in the structures may be substituted by a nitrogen atom, and at least one hydrogen atom in the structures may be substituted by Cl, $CF_3$, or $OCF_3$), $Z_1$ to $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, $Z_5$ represents a $CH_2$ group or an oxygen atom, at least one of $Z_1$ and $Z_2$ present is not a single bond, $l_1$ represents 0 or 1, $m_1$ and $m_2$ each independently represent 0 to 3, and $m_1+m_2$ is 1, 2, or 3), and the RGB three-color pixel portions include, as a colorant in a G pixel portion, a halogenated metal phthalocyanine pigment containing as a central metal a metal selected from the group consisting of Al, Si, Sc, Ti, V, Mg, Fe, Co, Ni, Zn, Ga, Ge, Y, Zr, Nb, In, Sn, and Pb, wherein when the central metal is trivalent, any one of a halogen atom, a hydroxyl group, and a sulfonic acid group is bonded to the central metal or the central metal is oxo- or thio-bridged, and when the central metal is a tetravalent metal, an oxygen atom or any two, which may be the same or different, selected from halogen atoms, hydroxyl groups, and sulfonic acid groups are bonded to the central metal.

2. The liquid crystal display device according to claim 1, wherein the RGB three-color pixel portions include, as colorants, a diketopyrrolopyrrole pigment and/or anionic red organic dye in a R pixel portion, and a s-type copper phthalocyanine pigment and/or cationic blue organic dye in a B pixel portion.

3. The liquid crystal display device according to claim 1, wherein the RGB three-color pixel portions include, as colorants, C. I. Solvent Red 124 in the R pixel portion, and C. I. Solvent Blue 7 in the B pixel portion.

4. The liquid crystal display device according to claim 1, wherein the RGB three-color pixel portions include, as colorants, C. I. Pigment Red 254 in the R pixel portion, and C. I. Pigment Blue 15:6 in the B pixel portion.

5. The liquid crystal display device according to claim 1, wherein the G pixel portion contains a halogenated zinc phthalocyanine pigment containing Zn as a central metal and 8 to 16 halogen atoms bonded to benzene rings of a phthalocyanine molecule per molecule of phthalocyanine.

6. The liquid crystal display device according to claim 1, wherein the G pixel portion contains C. I. Pigment Green 58.

7. The liquid crystal display device according to claim 1, wherein the G pixel portion further contains at least one organic dye/pigment selected from the group consisting of C. I. Pigment Yellow 150, 215, 185, and 138, and C. I. Solvent Yellow 21, 82, 83:1, and 33.

8. The liquid crystal display device according to claim 1, wherein the color filter further includes a Y pixel portion, and contains, as a colorant in the Y pixel portion, at least one yellow organic dye/pigment selected from the group consisting of C. I. Pigment Yellow 150, 215, 185, 138, and 139, and C. I. Solvent Yellow 21, 82, 83:1, 33, and 162.

9. The liquid crystal display device according to claim 1, wherein the liquid crystal composition layer further contains at least one compound represented by general formula (LC5), (LC5)

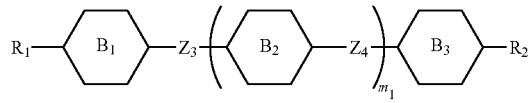

(in the formula, $R_1$ and $R_2$ each independently represent an alkyl group having 1 to 15 carbon atoms, at least one $CH_2$ group in the alkyl group may be substituted by —O—, —CH=CH—, —CO—, —OCO—, —COO—, —C≡C—, —CF$_2$O—, or —OCF$_2$— so that oxygen atoms are not directly adjacent to each other, at least one hydrogen atom in the alkyl group may be arbitrarily substituted by a halogen, $B_1$ to $B_3$ each independently represent any one of the following,

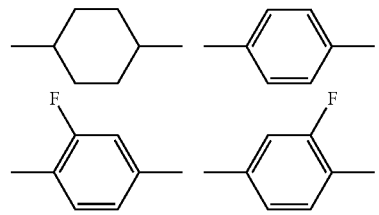

(in the formulae, at least one $CH_2CH_2$ group in a cyclohexane ring may be substituted by —CH=CH—, —CF$_2$O—, or —OCF$_2$—, and at least one CH group in a benzene ring may be substituted by a nitrogen atom), $Z_3$ and $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, at least one of $Z_3$ and $Z_4$ is not a single bond, and $m_1$ represents 0 to 3).

10. The liquid crystal display device according to claim 1, wherein the general formula (LC1) represents at least one compound selected from the group consisting of compounds represented by general formula (LC1)-1 to general formula (LC1)-7 below, (LC1-1)

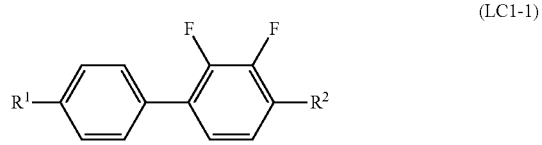

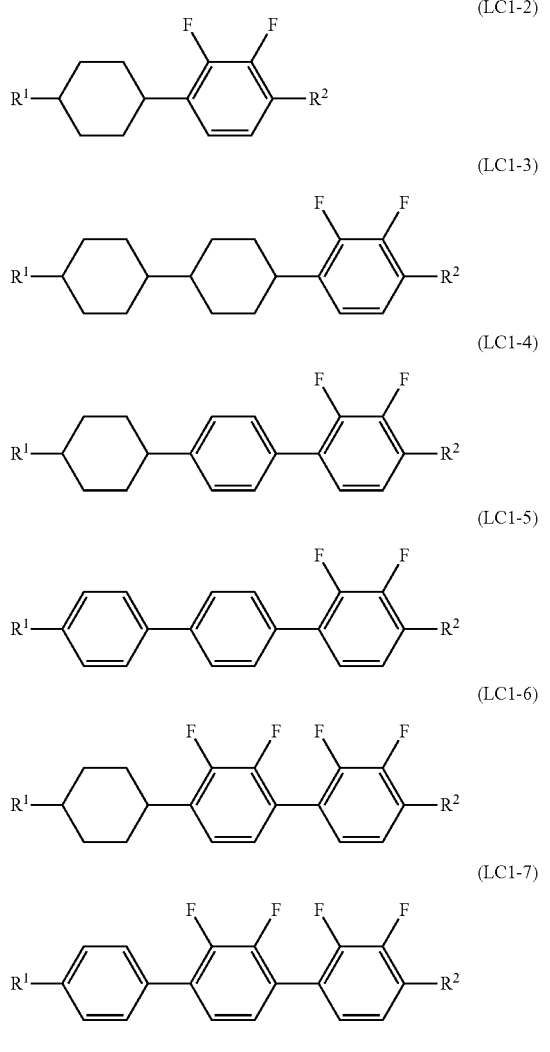

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

11. The liquid crystal display device according to claim 1, wherein the general formula (LC2) represents at least one compound selected from the group consisting of compounds represented by general formula (LC2)-1 to general formula (LC2)-15 below,

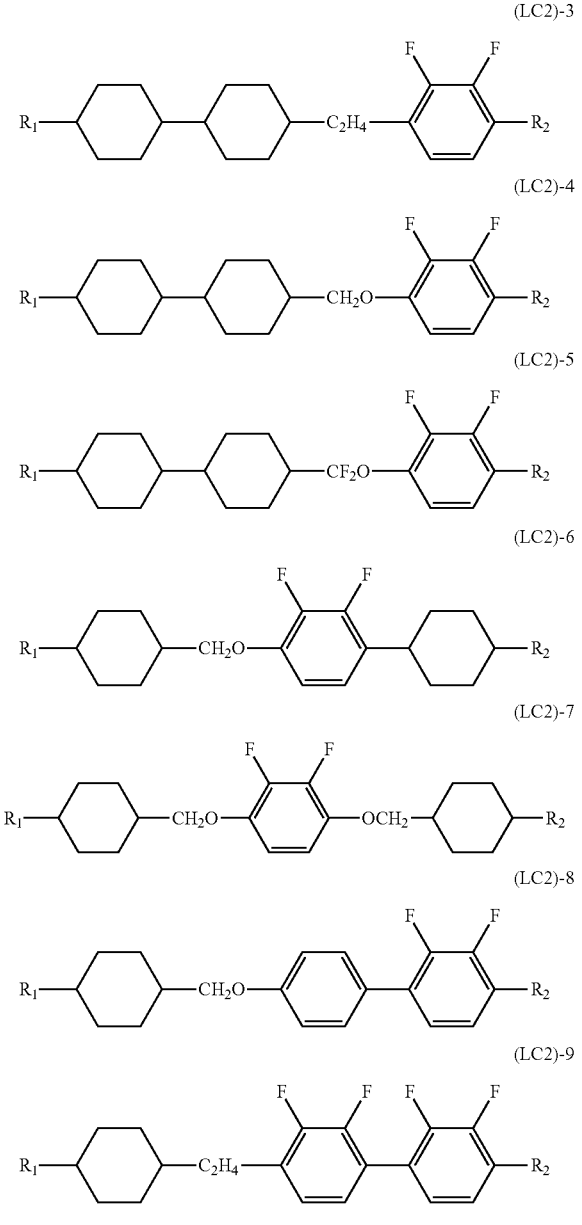

(LC2)-13

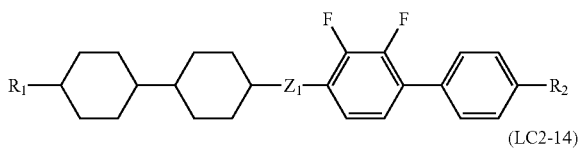

(LC2-14)

(LC2-15)

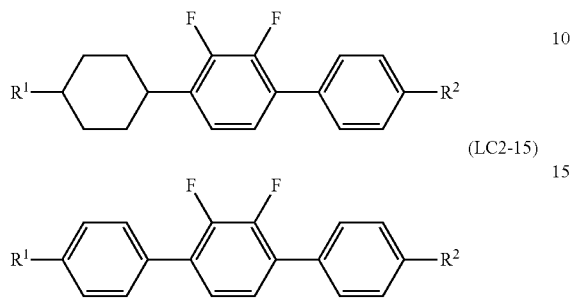

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms, $Z^1$ represents —CH$_2$CH$_2$—, —OCH$_2$—, —CH$_2$O—, —OCF$_2$—, or —CF$_2$O—, and $A^1$ represents any one of the following structures)

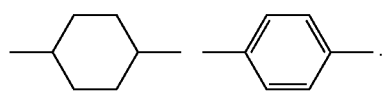

12. The liquid crystal display device according to claim 1, wherein the general formula (LC3) represents at least one compound selected from the group consisting of compounds represented by general formula (LC3)-1 to general formula (LC3)-6 below, and the general formula (LC4) represents at least one compound selected from the group consisting of compounds represented by general formula (LC4)-1 to general formula (LC4)-4 below, (LC3)-1

(LC3)-2

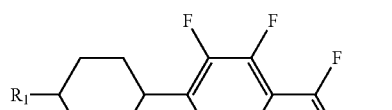

(LC3)-3

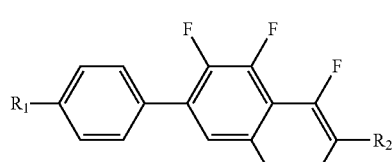

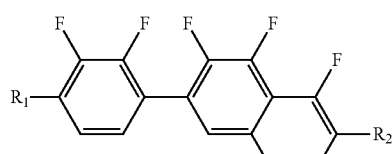

(LC3)-4

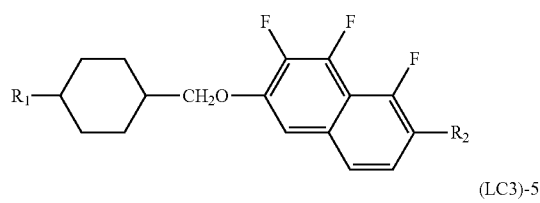

(LC3)-5

(LC3)-6

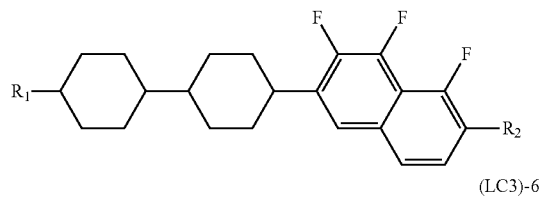

(LC4)-1

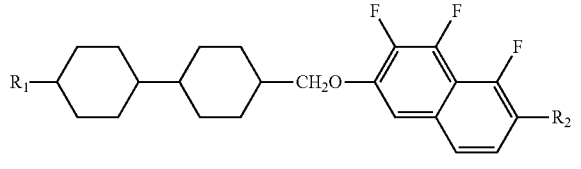

(LC4)-2

(LC4)-3

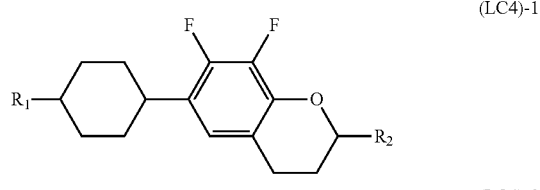

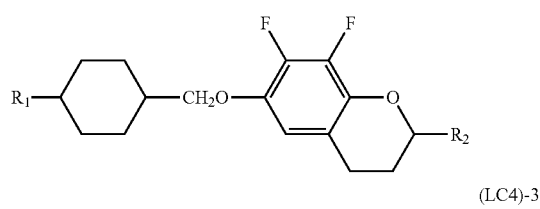

(LC4)-4

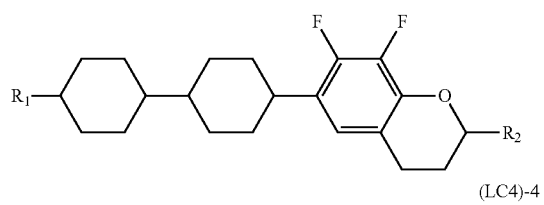

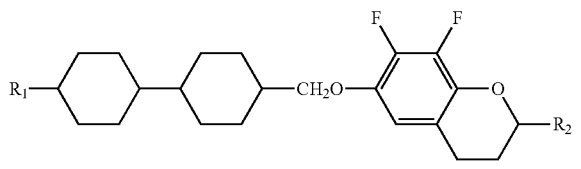

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

13. The liquid crystal display device according to claim 9, wherein the general formula (LC5) represents at least one compound selected from the group consisting of compounds represented by general formula (LC5)-1 to general formula (LC5)-13,

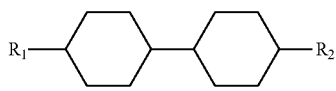 (LC5)-1

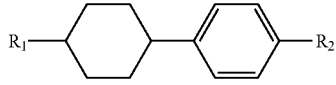 (LC5)-2

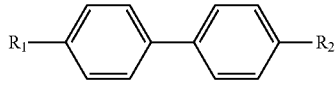 (LC5)-3

 (LC5)-4

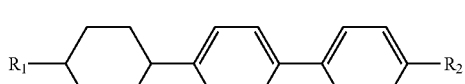 (LC5)-5

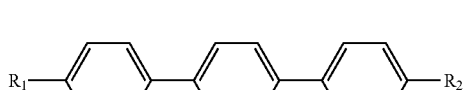 (LC5)-6

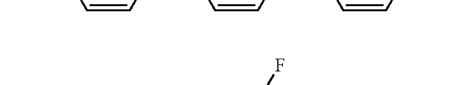 (LC5)-7

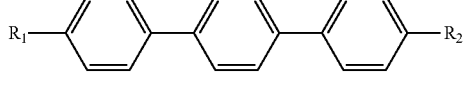 (LC5)-8

 (LC5)-9

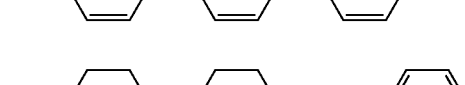 (LC5)-10

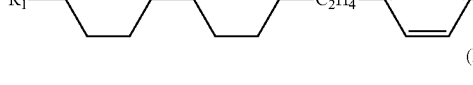 (LC5)-11

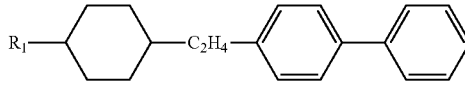 (LC5)-12

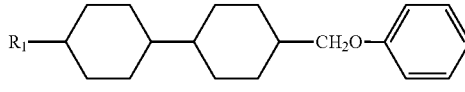 (LC5)-12

-continued

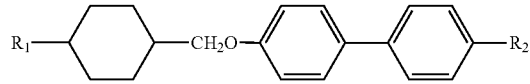 (LC5)-12

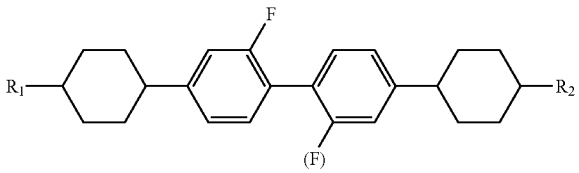 (LC5)-13

(in the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

14. The liquid crystal display device according to claim 1, wherein the liquid crystal composition layer is obtained by polymerizing the liquid crystal composition further containing at least one polymerizable compound.

15. The liquid crystal display device according to claim 14, wherein the polymerizable compound is a disk-shaped liquid crystal compound having a structure in which a benzene derivative, a triphenylene derivative, a truxene derivative, a phthalocyanine derivative, or a cyclohexane derivative serves as a central mother nucleus of a molecule and is radially substituted by linear alkyl groups, linear alkoxy groups, or substituted benzoyloxy groups as side chains.

16. The liquid crystal display device according to claim 14, wherein the polymerizable compound is a polymerizable compound represented by general formula (PC1),

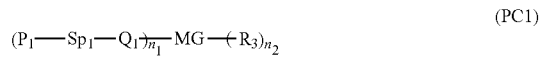 (PC1)

(in the formula, $P_1$ represents a polymerizable functional group, $Sp_1$ represents a spacer group having 0 to 20 carbon atoms, $Q_1$ represents a single bond, —O—, —NH—, —NH-COO—, —OCONH—, —CH=CH—, —CO—, —COO—, —OCO—, —OCOO—, —OOCO—, —CH=CH—, —CH=CH—COO—, —OCO—CH=CH—, or —C≡C—, $n_1$ and $n_2$ each represent 1, 2, or 3, MG represents a mesogenic group or a mesogenity supporting group, $R_3$ represents a halogen atom, a cyano group, or an alkyl group having 1 to 25 carbon atoms, at least one $CH_2$ group in the alkyl group may be substituted by —O—, —S—, —NH—, —N(CH$_3$)—, —CO—, —COO—, —OCO—, —OCOO—, —SCO—, —COS—, or —C≡C— so that oxygen atoms are not directly adjacent to each other, and alternatively $R_3$ represents $P_2$-$Sp_2$-$Q_2$-(wherein $P_2$, $Sp_2$, and $Q_2$ represent the same meanings as $P_1$, $Sp_1$, and $Q_1$, respectively).

* * * * *